(12) United States Patent
Aguilar Ruelas et al.

(10) Patent No.: US 11,951,950 B2
(45) Date of Patent: Apr. 9, 2024

(54) SEAT WITH REMOVABLE SUPPORT MEMBER

(71) Applicant: Ford Global Technologies, LLC, Dearborn, MI (US)

(72) Inventors: Eduardo Arturo Aguilar Ruelas, Mexico City (MX); Jonathan Eli Contla Valenzuela, Cuautitlan (MX); Amparo Sonia Sala Macias, Ecatepec (MX); Jessica Yobana Mayo Anzurez, Estado de México (MX)

(73) Assignee: Ford Global Technologies, LLC, Dearborn, MI (US)

( * ) Notice: Subject to any disclaimer, the term of this patent is extended or adjusted under 35 U.S.C. 154(b) by 350 days.

(21) Appl. No.: 17/445,009

(22) Filed: Aug. 13, 2021

(65) Prior Publication Data
US 2023/0052314 A1  Feb. 16, 2023

(51) Int. Cl.
*B60R 7/04* (2006.01)
*B60N 2/30* (2006.01)
*B60N 2/70* (2006.01)

(52) U.S. Cl.
CPC .............. *B60R 7/043* (2013.01); *B60N 2/304* (2013.01); *B60N 2/3047* (2013.01); *B60N 2/305* (2013.01); *B60N 2/7005* (2013.01); *B60N 2205/30* (2013.01)

(58) Field of Classification Search
None
See application file for complete search history.

(56) References Cited

U.S. PATENT DOCUMENTS

| | | | | |
|---|---|---|---|---|
| 4,836,597 A | * | 6/1989 | Izumida | B60N 2/366 248/501 |
| 5,558,386 A | * | 9/1996 | Tilly | B60N 2/305 296/65.05 |
| 5,975,611 A | * | 11/1999 | Hoshihara | B60N 2/305 297/336 |
| 6,749,264 B2 | | 6/2004 | Jeong | |
| 7,137,663 B2 | | 11/2006 | Tsujibayashi et al. | |
| 7,152,925 B2 | | 12/2006 | Hur et al. | |
| 8,215,695 B2 | | 7/2012 | Ida et al. | |
| 10,232,739 B1 | * | 3/2019 | Korte | B60N 2/01 |
| 11,059,399 B1 | * | 7/2021 | Line | B60N 2/34 |
| 11,529,894 B1 | * | 12/2022 | Pearson | B60N 2/2887 |
| 2003/0006641 A1 | * | 1/2003 | Habedank | B60N 2/2893 297/463.1 |
| 2004/0256877 A1 | * | 12/2004 | Tromblee | B60R 22/18 296/68.1 |

(Continued)

FOREIGN PATENT DOCUMENTS

CN 215921977  *  3/2022
CN 215921977 U  *  3/2022

(Continued)

*Primary Examiner* — David E Allred
(74) *Attorney, Agent, or Firm* — Vichit Chea; Price Heneveld LLP

(57) ABSTRACT

A vehicle seating assembly is provided that includes a seat that includes a base and a removable support member pivotably coupled to the base and movable between a closed position and an open position. The vehicle seating assembly further includes a seatback and an attachment assembly disposed between the removable support member and the base.

20 Claims, 18 Drawing Sheets

(56) References Cited

U.S. PATENT DOCUMENTS

| | | | | |
|---|---|---|---|---|
| 2005/0046251 A1* | 3/2005 | Foelster | ............... | B60N 2/2893 297/253 |
| 2006/0006712 A1* | 1/2006 | Clement | ............... | B60N 2/2866 297/238 |
| 2008/0012403 A1* | 1/2008 | Foelster | ............... | B60N 2/2893 297/217.1 |
| 2009/0115229 A1* | 5/2009 | Messner | ................ | B60N 2/68 297/188.1 |
| 2009/0121523 A1* | 5/2009 | Johnson | ............. | B64D 11/0638 297/217.3 |
| 2015/0165950 A1* | 6/2015 | Sachs | ................ | B60N 2/62 297/452.48 |
| 2016/0144792 A1* | 5/2016 | Gawade | ................ | B60N 2/22 296/64 |
| 2016/0193949 A1* | 7/2016 | Pywell | ................ | B60N 3/104 297/188.1 |
| 2017/0088023 A1* | 3/2017 | Smuk | ................ | B60N 2/01583 |
| 2017/0106773 A1* | 4/2017 | Aguilar Ruelas | ........ | B60N 2/32 |
| 2017/0225751 A1* | 8/2017 | Fuller, IV | ............... | B63B 29/04 |
| 2018/0015847 A1* | 1/2018 | Renaudin | ............... | B60N 2/943 |
| 2018/0141474 A1* | 5/2018 | Imayou | ............... | B60N 2/36 |
| 2019/0031054 A1* | 1/2019 | Line | .................... | B60N 2/32 |
| 2019/0031055 A1* | 1/2019 | Line | .................... | B60N 3/002 |
| 2020/0079251 A1* | 3/2020 | van Essen | ............ | B60N 2/2872 |
| 2020/0139861 A1* | 5/2020 | Nevarez | ................... | B60N 3/06 |
| 2021/0237618 A1* | 8/2021 | Peterson | ............... | B60N 2/502 |
| 2022/0105873 A1* | 4/2022 | Harmon | .................. | B60R 7/043 |
| 2022/0305968 A1* | 9/2022 | Guo | ...................... | B60N 2/2887 |
| 2022/0346569 A1* | 11/2022 | Liu | ........................ | B62B 7/12 |
| 2023/0294571 A1* | 9/2023 | Line | ....................... | B60N 2/305 296/65.01 |

FOREIGN PATENT DOCUMENTS

| | | | | |
|---|---|---|---|---|
| DE | 19650087 C1 | * | 12/1997 | ............... B60N 2/28 |
| DE | 10253446 A1 | * | 6/2004 | ............. B60N 2/289 |
| JP | 10264694 A | * | 10/1998 | |
| JP | 2001334857 A | * | 12/2001 | ........... B60N 2/3013 |
| JP | 2017210081 A1 | | 11/2017 | |

\* cited by examiner

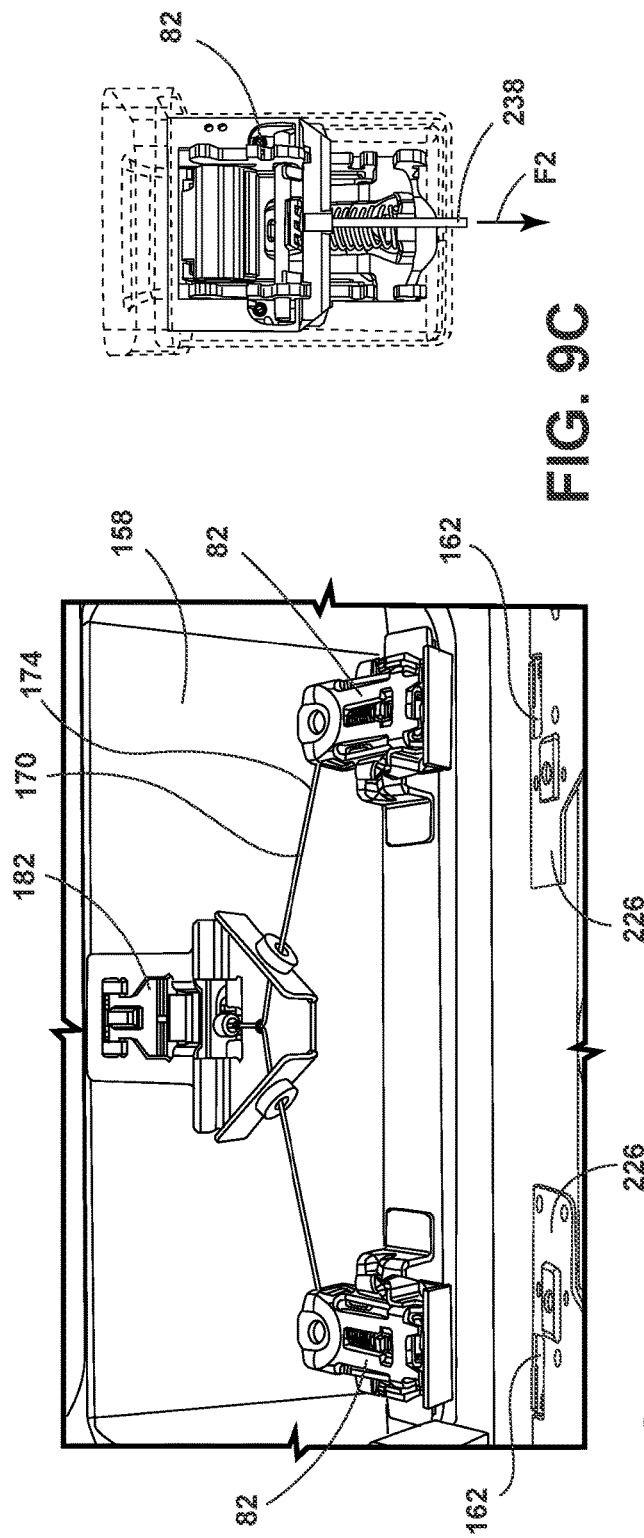
FIG. 9A
FIG. 9B
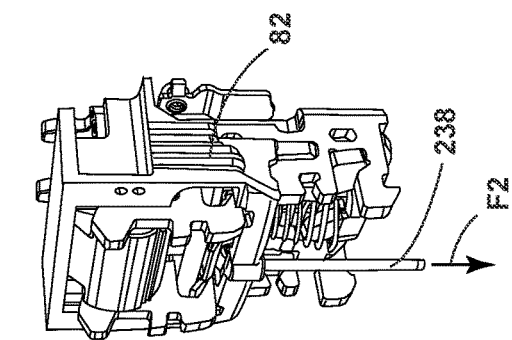
FIG. 9C
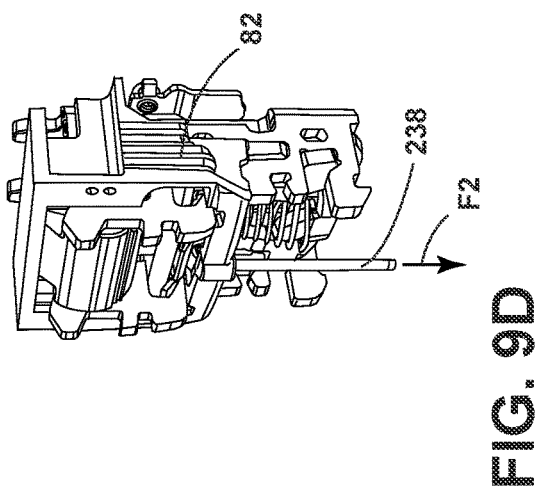
FIG. 9D

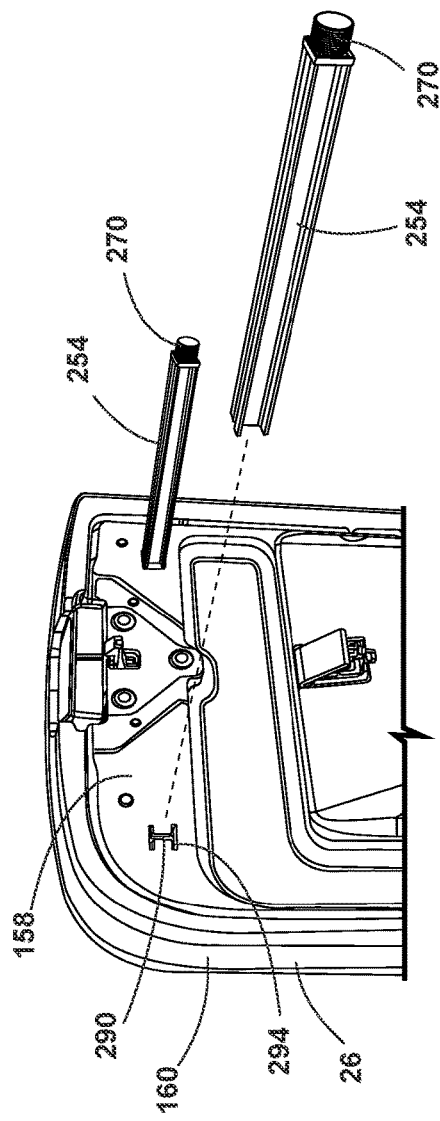
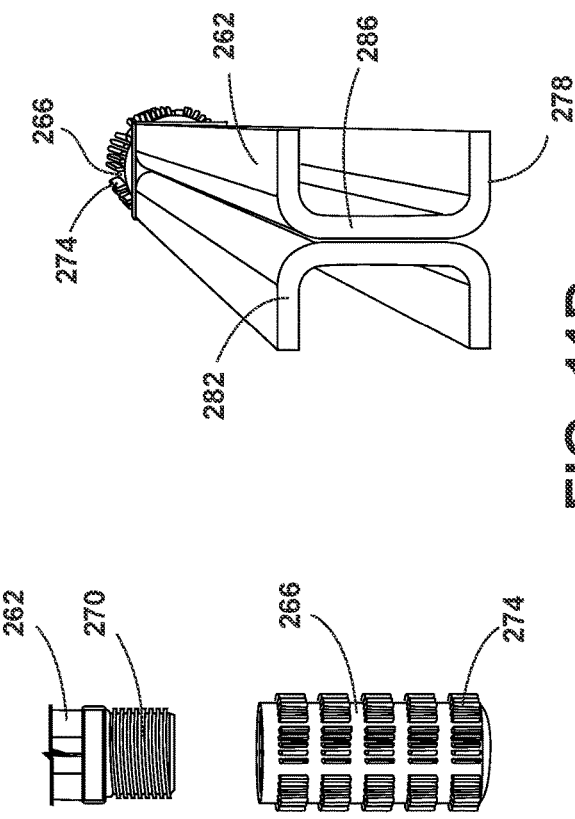
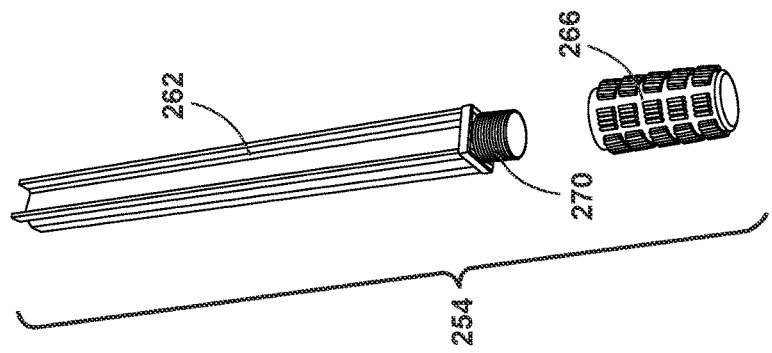
FIG. 11A  FIG. 11B  FIG. 11C  FIG. 11D

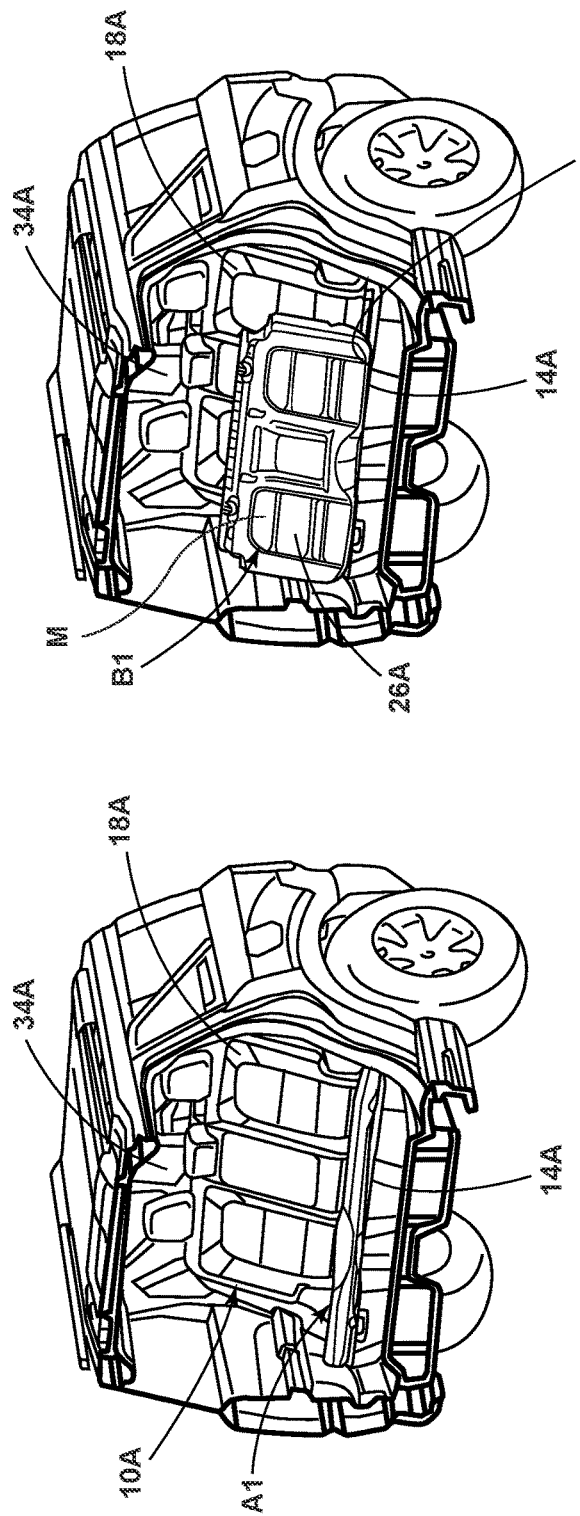
FIG. 12A
FIG. 12B
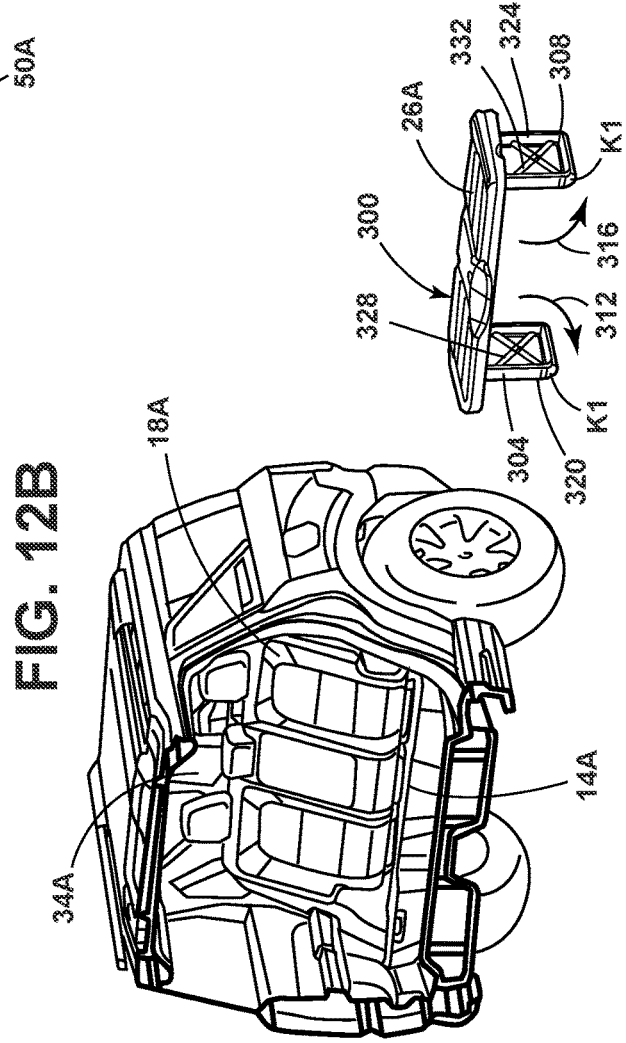
FIG. 12C

SEAT WITH REMOVABLE SUPPORT MEMBER

FIELD OF THE DISCLOSURE

The present disclosure generally relates to a vehicle seating assembly.

BACKGROUND OF THE DISCLOSURE

A vehicle seating assembly may be used for a variety of purposes. It may be advantageous to detach a portion of a seat from a vehicle seating assembly.

SUMMARY OF THE DISCLOSURE

According to a first aspect of the present disclosure, a vehicle seating assembly is provided. The vehicle seating assembly includes a seat that includes a base and a removable support member pivotably coupled to the base and movable between a closed position and an open position. The vehicle seating assembly also includes a seatback and an attachment assembly disposed between the removable support member and the base.

Embodiments of the first aspect of the present disclosure can include any one or a combination of the following features:
  the attachment assembly includes a latch assembly and a tongue;
  the tongue is pivotably coupled to the base;
  the tongue is rotatable about an axis of rotation disposed along an edge of the base;
  the edge of the base includes an edge of the base disposed adjacent to the seatback;
  the tongue extends from an elongated member rotatable around the axis of rotation;
  a hinge disposed between the removable support member and the base;
  a storage cavity defined by the base and the removable support member in the closed position;
  a seat prop storable in the removable support member;
  the edge of the base includes an edge of the base disposed opposite the seatback;
  the removable support member is disposed in a substantially upright position to define a storage space between the removable support member and the seatback;
  a seat prop disposable in the removable support member and positionable orthogonal to the removable support member and the seatback to further define the storage space between the removable support member and the seatback; and/or
  the removable seat prop comprises a seat leg movable between an initial position adjacent to the removable support member and a final position orthogonal to the removable support member.

According to a second aspect of the present disclosure, a vehicle seating assembly is provided. The vehicle seating assembly includes a base disposed on a vehicle floor, a hinge disposed along an edge of the base and defining an axis of rotation, a removable support member rotatable about the axis of rotation between a closed position and an open position, and a latch assembly and a tongue disposed between the removable support member and the hinge, wherein the latch assembly is movable between a latched position and an unlatched position in response to an actuation force.

Embodiments of the second aspect of the present disclosure can include any one or a combination of the following features:
  the latch assembly is disposed in the removable support member and the tongue is operably coupled to the hinge and rotatable about the axis of rotation defined by the hinge;
  the latch assembly includes a pair of latch assemblies and wherein the tongue includes a pair of tongues; and/or
  the tongues are integral to an elongated member rotatably coupled to the hinge.

According to a third aspect of the present disclosure, a vehicle seating assembly is provided. The vehicle seating assembly includes a seat base, a removable support member positionable between an attached position and a detached position relative to the seat base and rotatable between a closed position and an open position relative to the seat base, and an attachment assembly disposed between the seat base and the removable support member. The attachment assembly includes a latch assembly disposed in the support member. The vehicle seating assembly further includes an intermediate assembly disposed between an actuator and the latch assembly, wherein an actuation force is exerted on the actuator to move the latch assembly from a latched position to an unlatched position, thereby moving the removable support member form the attached position to the detached position.

Embodiments of a third aspect of the present disclosure can include any one or a combination of the following features:
  a panel disposed in the removable support member, wherein the latch assembly and the actuator are mounted to the panel; and/or
  an anchor coupled to the seat base and engageable with the latch assembly.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 9A is a back perspective view of the intermediate assembly and a pair of latch assemblies, according to an aspect of the present disclosure;

FIG. 9B is a perspective view of a latch assembly, a latch assembly housing, and an intermediate assembly, according to an aspect of the present disclosure;

FIG. 9C is a bottom perspective view of a latch assembly and an actuation force, according to an aspect of the present disclosure;

FIG. 9D is a side perspective view of a latch assembly and an actuation force, according to an aspect of the present disclosure;

FIG. 11A is an assembly view of a seat prop, according to an aspect of the present disclosure;

FIG. 11B is an assembly view of a portion of a seat prop, according to an aspect of the present disclosure;

FIG. 11C is an assembly view of pair of seat props and a removable support member, according to an aspect of the present disclosure;

FIG. 11D is a top perspective view of a seat prop, according to an aspect of the present disclosure;

FIG. 12A is a cutaway view of a vehicle interior with a vehicle seating assembly, according to another aspect of the present disclosure;

FIG. 12B is a cutaway view of a vehicle interior with a vehicle seating assembly with a removable support member in a substantially upright position, according to another aspect of the present disclosure;

FIG. 12C is a cutaway view of a vehicle interior with a removable support member detached from the vehicle seating assembly and configured as a bench, according to another aspect of the present disclosure;

DETAILED DESCRIPTION

Figure 1:
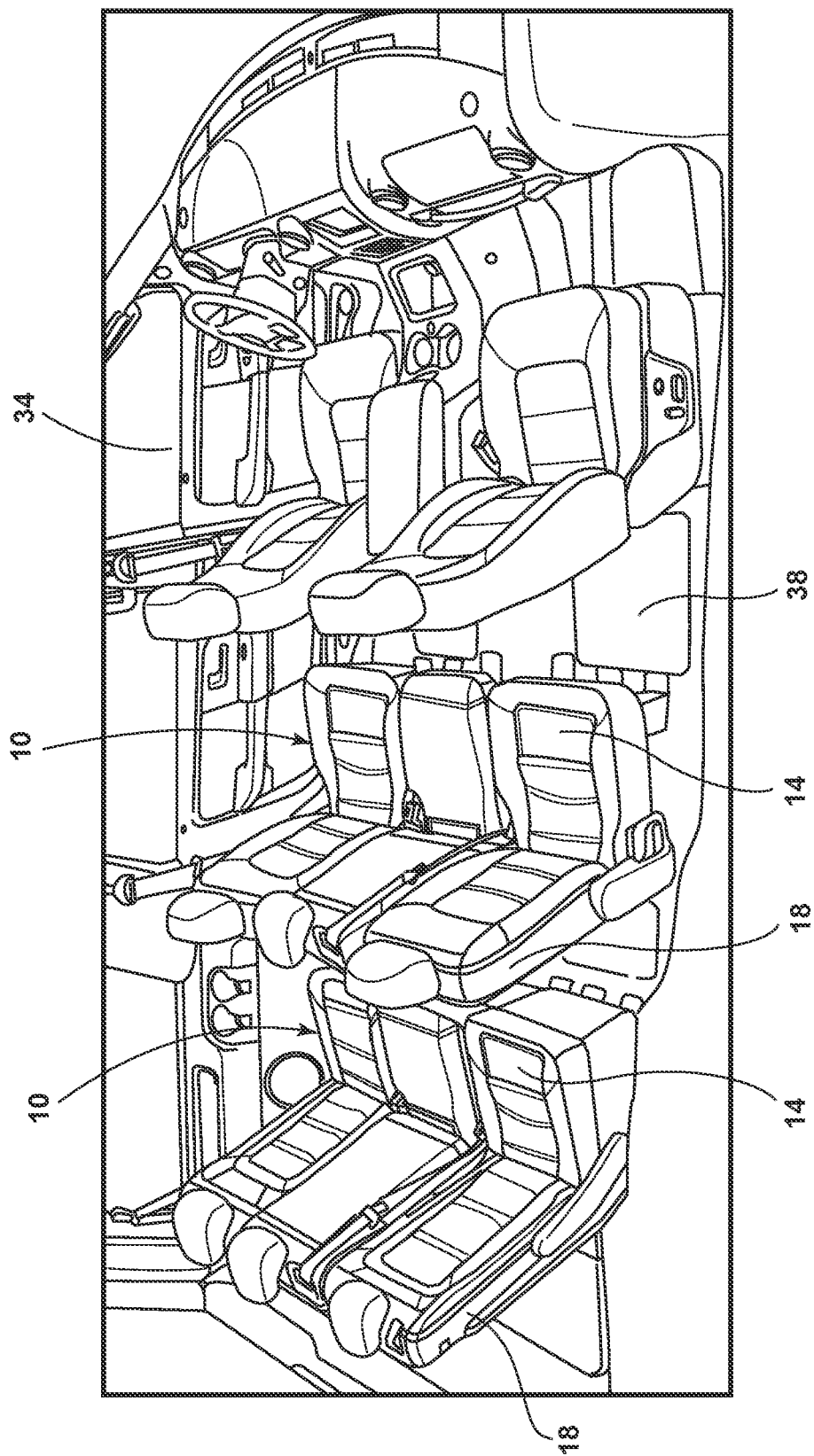
FIG. 1 is a perspective view of vehicle seating assemblies disposed in an interior of a vehicle, according to an aspect of the present disclosure.

Referring to FIGS. 1-18, a vehicle seating assembly 10 includes a seat 14 and a seatback 18. The seat 14 includes a base 22 and a removable support member 26 pivotably coupled to the seat 14 and movable between a closed position A and an open position B. The seating assembly 10 also includes an attachment assembly 30 disposed between the removable support member 26 and the base 22.

Referring to FIG. 1, a vehicle interior 34 may include seating assemblies 10. The seating assemblies 10 may be mounted to a vehicle floor 38. The seating assemblies 10 may include seats 14 and seatbacks 18.

Figure 3:
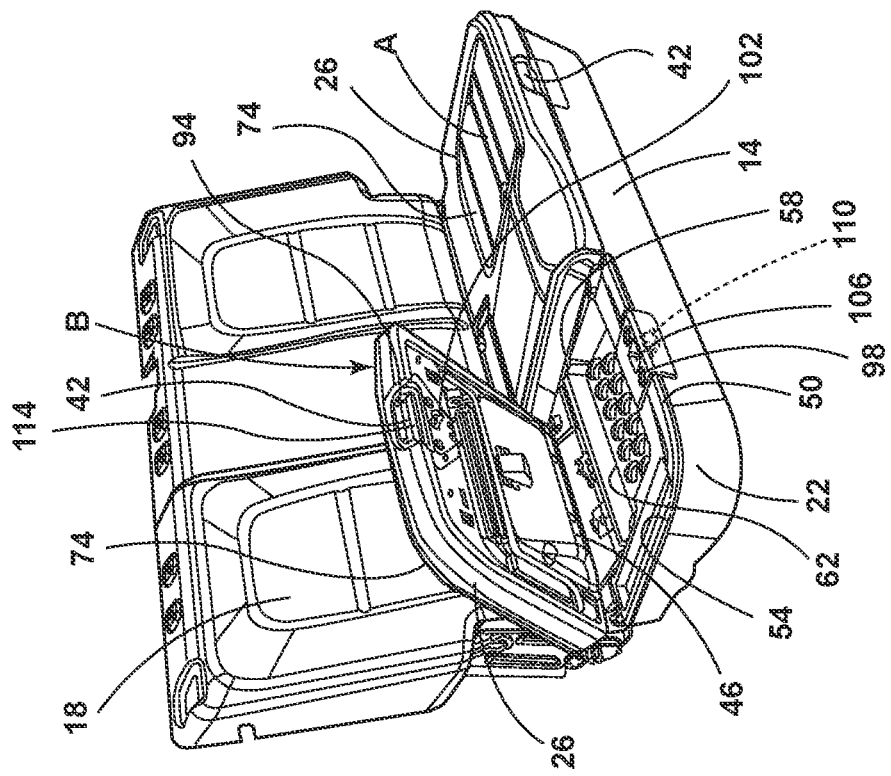
FIG. 3 is a perspective view of a vehicle seating assembly with one removable support member in the open position and one removable support member in the closed position, according to an aspect of the present disclosure.
Figure 2:
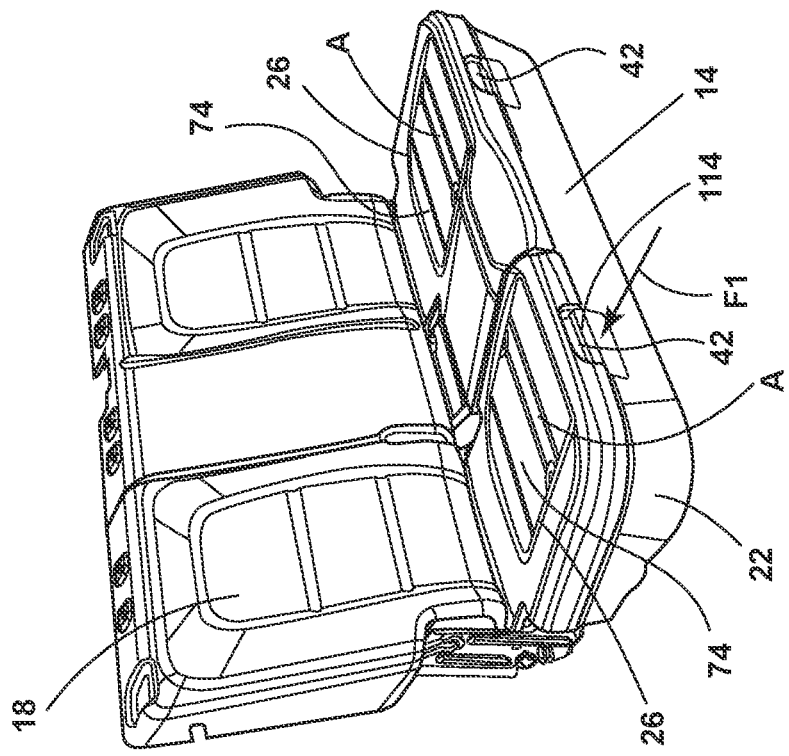
FIG. 2 is a perspective view of a vehicle seating assembly with two removable support members in the closed positions, according to an aspect of the present disclosure.

With reference to FIGS. 2-3, a seating assembly 10 may include removable support members 26. In the example shown, the removable support members 26 may be coupled to a seat base 22. The removable support members 26 may be moved from the closed position A to the open position B by exerting an actuation force F1 on the actuator 42. The actuator 42 may include an actuator part 94 disposed on the removable support member 26 and an actuator part 98 disposed on the seat base 22. The actuator part 94 disposed on the removable support member 26 may include a hook 102. The actuator part 98 disposed on the seat base 22 may include a recess 106 with a striker 110 or other mechanism for engaging with the hook 102. The actuator may be moved to release the hook 102 from the striker 110. The actuator force F1 may be exerted on a button 114 disposed in the actuator 42.

With continuing reference to FIGS. 2 and 3, the seat 14 may include an edge 46 adjacent to the seatback 18, an edge 50 opposite the seatback 18, an edge 54 on the right side of the seat 14, and an edge 58 on the left side of the seat 14. The seating assembly 10 may be described with reference to an occupant seated in the seating assembly 10. Parts to the right side of a seated occupant may be referred to as being on the right side of the seating assembly 10. Parts to the left side of the seated occupant may be referred to as being on the left side of the seating assembly 10.

With continued reference to FIGS. 2-3, the removable support members 26 may rotate about an edge 46 of the seat 14 to move between the closed position A and the open position B. It is contemplated that in various other examples of the present disclosure, the removable support member 26 may rotate about edges 50, 54, or 58 of the seat 14. The removable support member 26 in the closed position A and the seat base 22 may define a storage cavity 62. More specifically, the storage cavity floor 66, the walls 70, and the movable support member 26 in the closed position A may define the storage cavity 62. Occupants may use the storage cavity 62 to store personal cargo such as blankets, first aid kits, sports equipment, and other items. The removable support member 26 may define a seating surface 74 of the seat 14. It is also contemplated that the seatback could include a removable support member. The removable support member of the seatback could be coupled to a seatback base and could define the seating surface of the seatback. The seatback base and the removable support member in a closed position could define a storage cavity in the seatback.

Figure 5:
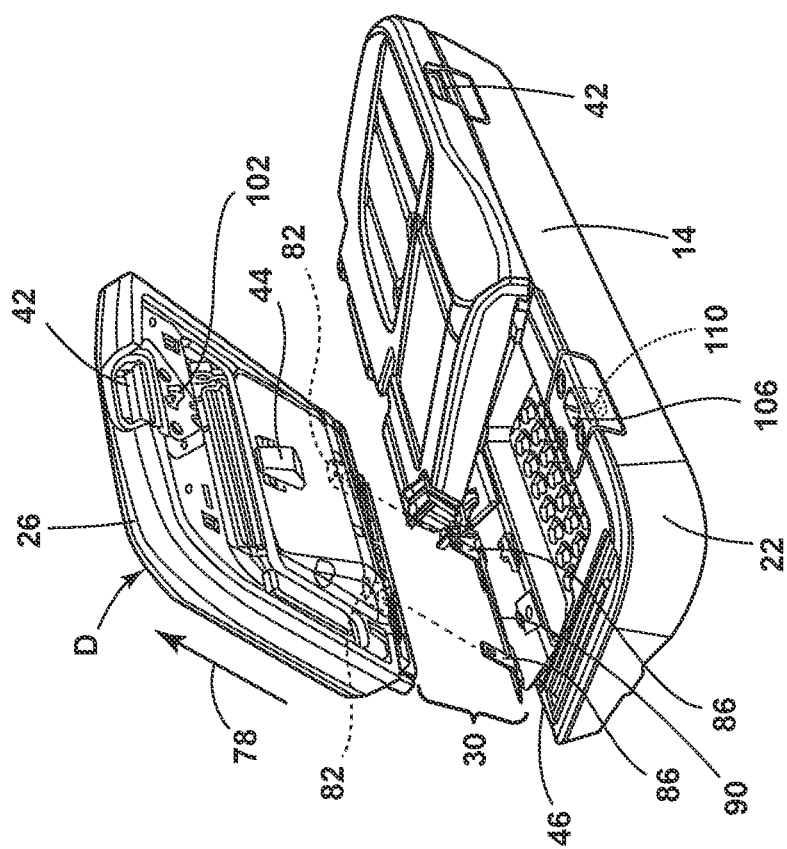
FIG. 5 is a perspective view of a seat base with one removable support member in the detached position and one removable support member in the closed position, according to an aspect of the present disclosure.
Figure 4:
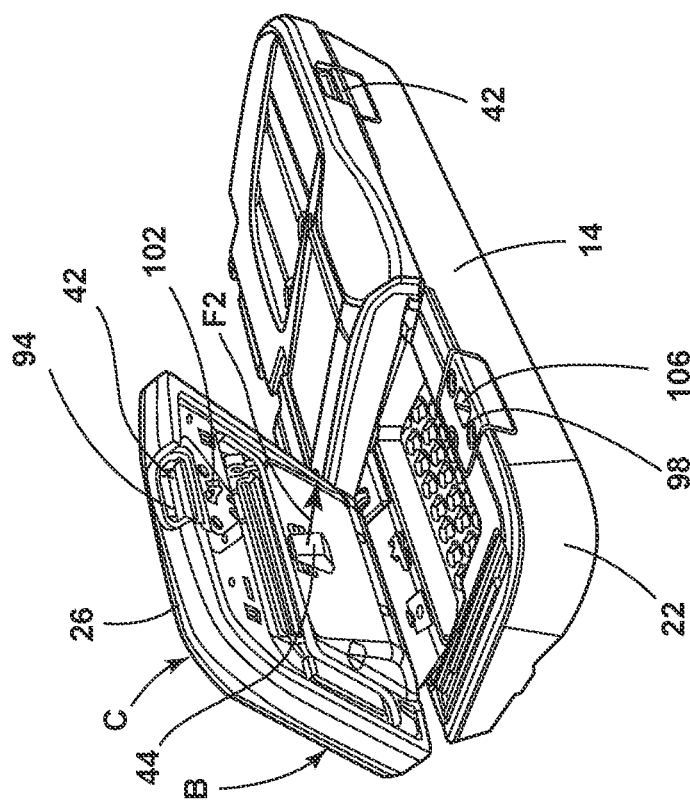
FIG. 4 is a perspective view of a seat base with one removable support member in the open position and one removable support member in the closed position, according to an aspect of the present disclosure.

Referring to FIGS. 4 and 5, the removable support member 26 is shown in an attached position C (FIG. 4) and a detached position D (FIG. 5). An attachment assembly 30 may extend between the removable support member 26 and the seat base 22. The attachment assembly 30 may include a latch assembly 82 and a tongue 86. Upon exertion of an actuation force F2 on the actuator 44, the removable support member 26 may be detached from the seat base 22 and moved in the direction shown by arrow 78. To move the removable support member 26 from the attached position C to the detached position D, the removable support member 26 may be detached from the tongues 86 extending from an elongated member 90 disposed along the edge 46 of the seat 14. The tongues 86 may be an example of an anchor that may receive the removable support member 26 to secure it to the seat base 22. Other examples of anchors may include strikers, wire loops, C-loops, hooks, and other constructions for securing the removable support member 26 to the seat base 22.

Referring to FIGS. 6A-6D, the removable support member 26 may rotate between the closed position A and the open position B. Hinges 122 may be disposed between the seat base 22 and a rod 126 extending through the hinges 122. The hinges 122 may include hinge plates 138 that may be fastened to the seat base 22. The rod 126 extending through the hinges 122 may define an axis of rotation 130 about which the removable support member 26 may rotate between the closed position A and the open position B. The rod 126 may be disposed in a channel 134 extending through the elongated member 90. The tongues 86 may extend from an elongated member 90. Alternatively, in another example, the elongated member 90 may rotate about an axis of rotation separate from the axis of rotation 130 defined by the rod 126. The elongated member 90 may be a stamped piece. The tongues 86 and the elongated member 90 may be an integral part. The tongues 86 may extend from the elongated member 90, and the tongues 86 may rotate as the elongated member 90 rotates about the axis of rotation 130.

Figure 6C:
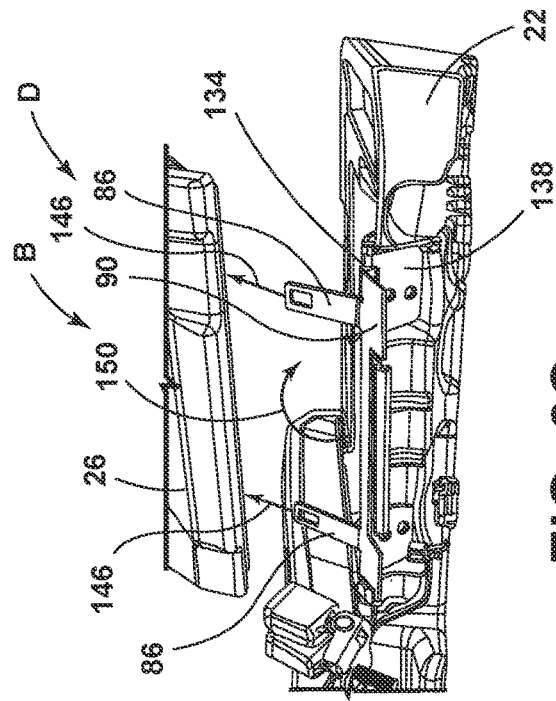
FIG. 6C is a perspective view of a pair of tongues and a removable support member in the detached position, according to an aspect of the present disclosure.
Figure 6D:
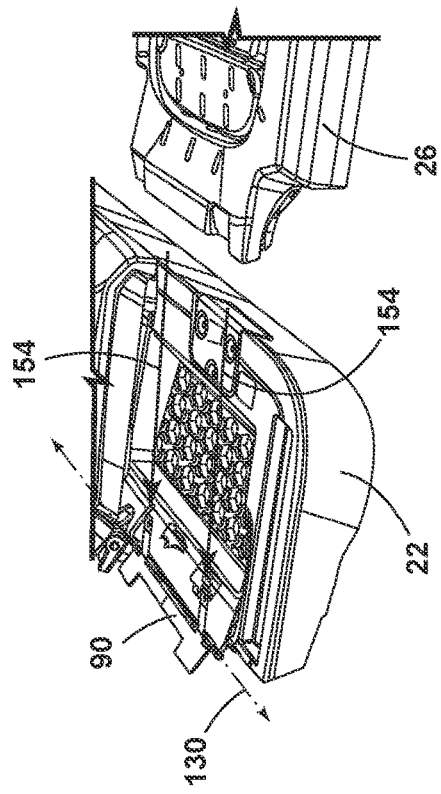
FIG. 6D is another perspective view of a pair of tongues and a removable support member in the detached position, according to an aspect of the present disclosure.
Figure 6A:
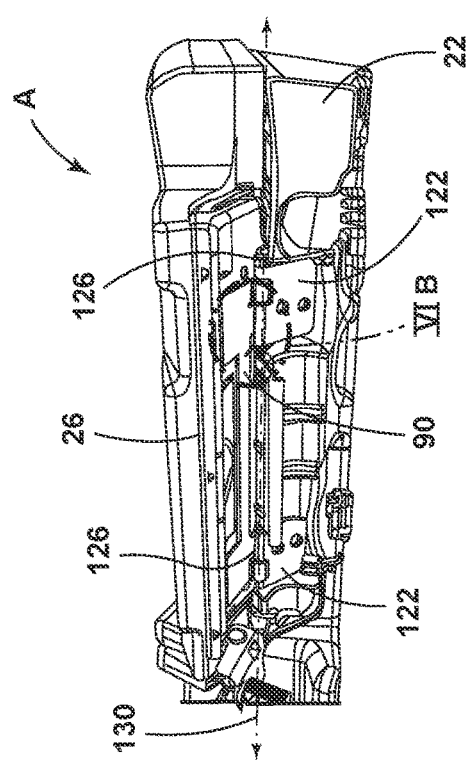
FIG. 6A is a perspective view of an elongated member disposed along a hinge of a vehicle seating assembly, according to an aspect of the present disclosure.
Figure 6B:
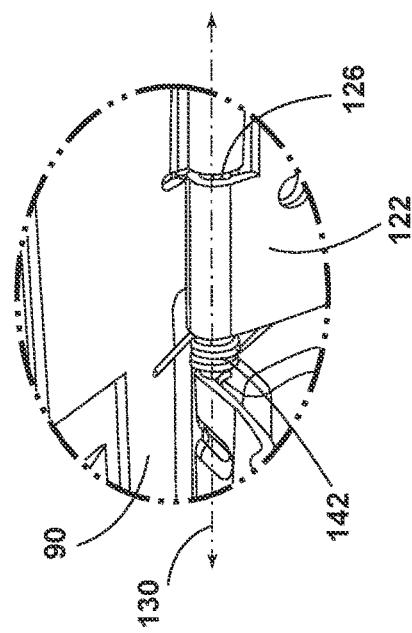
FIG. 6B is a perspective view of a biasing member disposed along the elongated member, according to an aspect of the present disclosure.

With continued reference to FIGS. 6A-6D, a biasing member (FIG. 6B) may be disposed proximate the rod 126. In the example shown, the biasing member may include a torsional spring 142 disposed around the rod 126. Referring to FIG. 6C, the removable support member 26 in an open position B may be disengaged from the tongues 86 and moved in the direction shown by arrows 146. The torsional spring 142 may be positioned to bias the elongated member 90 to move towards the closed position A of the removable support member 26 from the open position B of the removable support member 26 (FIG. 6C) to facilitate attachment of the removable support member 26 to the tongues 86. With reference to FIG. 6D, if the torsional spring 142 has biased the elongated member 90 to return to the closed position A from the open position B in the direction shown by arrow 150 (FIG. 6C), then an occupant may push the removable support member 26 toward the tongues 86 in the direction shown by arrows 154 to secure the removable support member 26 to the seat base 22.

Figure 7B:
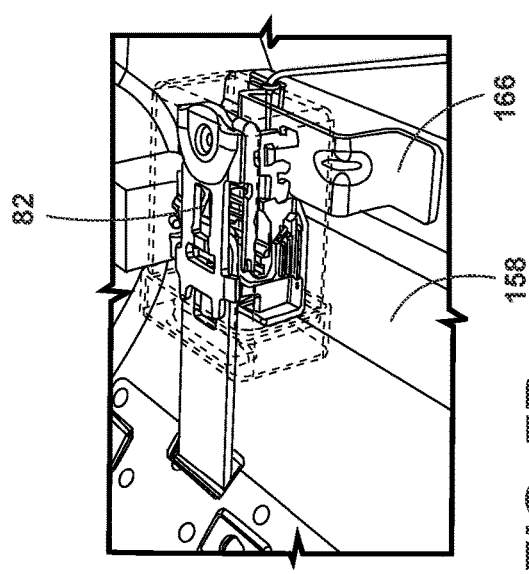
FIG. 7B is a perspective view of a latch assembly latched to a tongue, according to an aspect of the present disclosure.
Figure 7C:
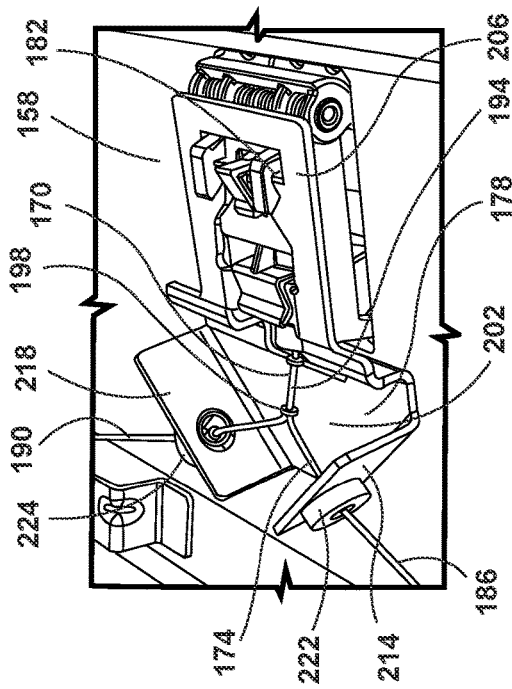
FIG. 7C is a perspective view of the intermediate assembly, according to an aspect of the present disclosure.
Figure 7A:
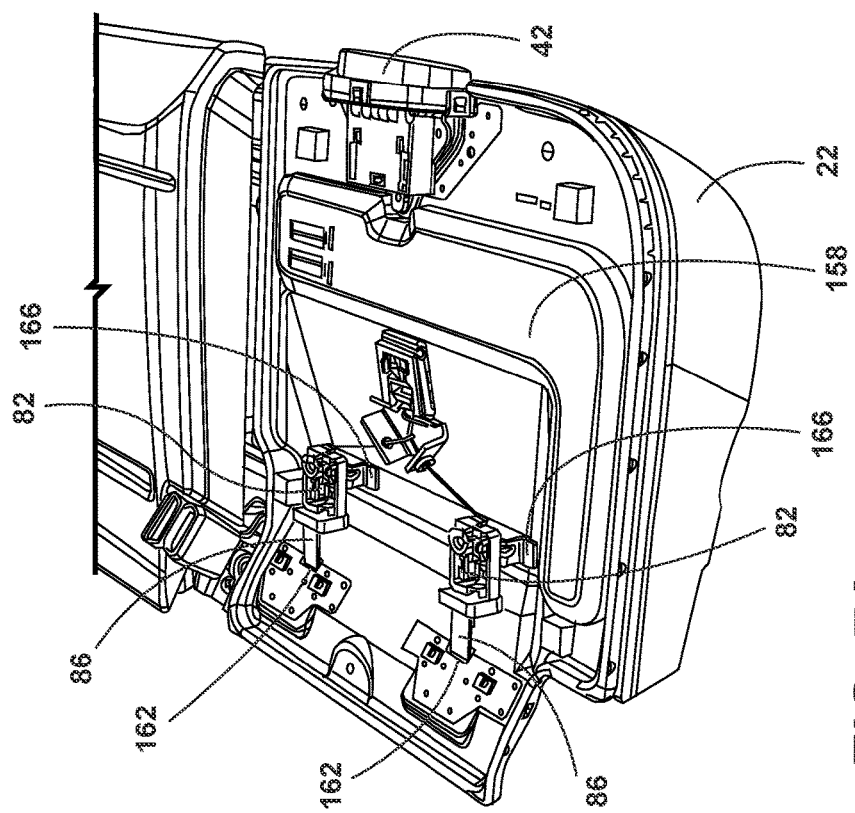
FIG. 7A is a perspective view of a pair of latch assemblies latched to a pair of tongues, an intermediate assembly, and an actuator disposed on a panel in a removable support member, according to an aspect of the present disclosure.

Referring to FIGS. 7A-7C, the removable support member 26 may include a panel 158. The panel 158 may be disposed below a cushion 160 (FIGS. 10A, 11C). The cushion 160 may be disposed below a seated occupant. The panel 158 may provide a stable support for mechanical components of the latch assemblies 82 and the actuators 42 and 44. The panel 158 may include slots 162 for receiving the tongues 86. Latch assemblies 82 may be latched to the tongues 86 to secure the removable support member 26 to the elongated member 90. The panel 158 may be a composite, a steel, or other metal. The panel 158 may be rigid or semi-rigid. With reference to FIG. 7B, the latch assemblies 82 may be secured to the panel 158 with brackets 166. The latch assemblies 82 may be similar to seat belt latches. It is contemplated that the latch assemblies 82 may include various latches used in vehicles. It is further contemplated that other latches similar to seat belt latches that are used outside of vehicles may also be used. Referring to FIG. 7C, an intermediate assembly 170 may be disposed on the panel 158 and in between the actuators 42 and 44 and the latch assemblies 82.

With continued reference to FIGS. 7A-7C, the intermediate assembly 170 may include a wire assembly 174 extending from the release mechanism 182 to the latch assemblies 82. The release mechanism 182 may be operably coupled to the actuator 44. An intermediate bracket 178 may be disposed over the release mechanism 182. The wire assembly 174 may be Y-shaped. The wire assembly 174 may include two branch wires 186 and 190. The two branch wires 186 and 190 may extend from a single wire 194. The two branch wires 186 and 190 may be twisted together to form the single wire 194. The single wire 194 may split into the two branch wires 186 and 190 at the junction 198. In some examples, cables or other connectors may be used instead of the two branch wires 186 and 190 and the single wire 194. The intermediate bracket 178 may include a lower portion 202 disposed on the panel 158, an upper portion 206 disposed above the release mechanism 182, and two flanges 214 and 218 orthogonal to the lower portion 202. Bushings 222 and 224 may be disposed in each of the two flanges 214 and 218. The branch wires 186 and 190 may extend through each of the two bushings 222 and 224. The two flanges 214 and 218 may serve as positioners for each of the two branch wires 186 and 190. The intermediate assembly 170 may be a device that transfers the actuation force F2 exerted on the actuator 44 to the latch assemblies 82 to release the latch assemblies 82 from the tongues 86. Accordingly, the removable support member 26 may be removable from base 22.

Figure 8B:
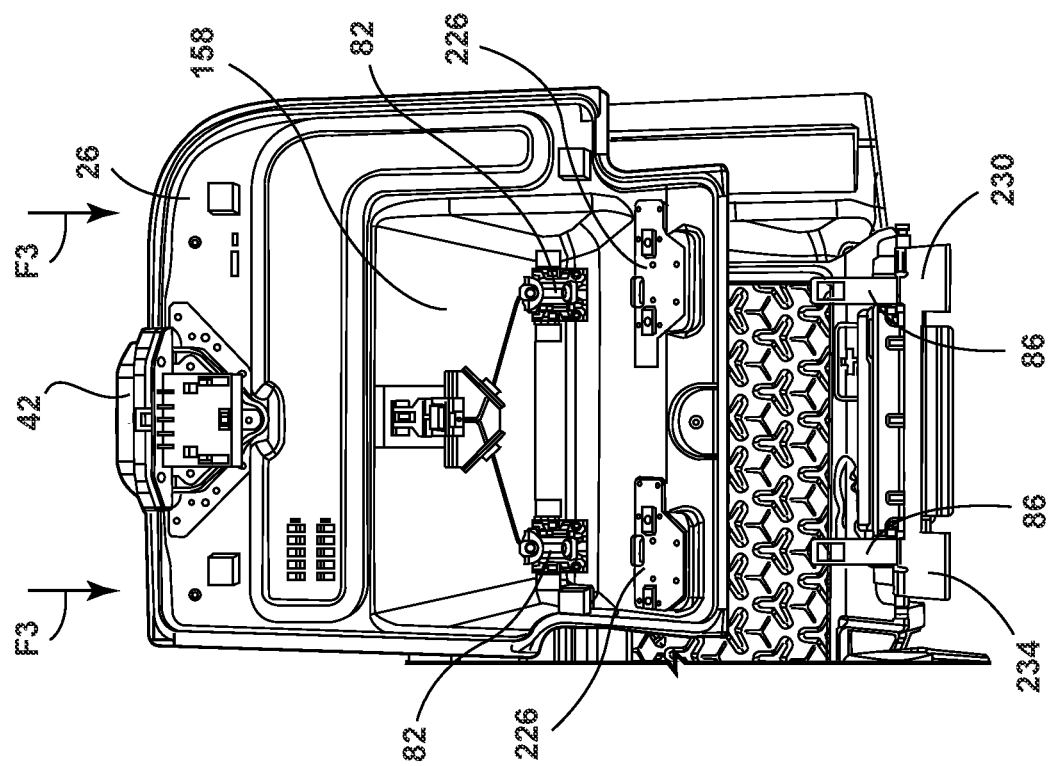
FIG. 8B is a top elevational view of a panel of the removable support member detached from the tongues and an installation force exerted on the panel, according to an aspect of the present disclosure.
Figure 8A:
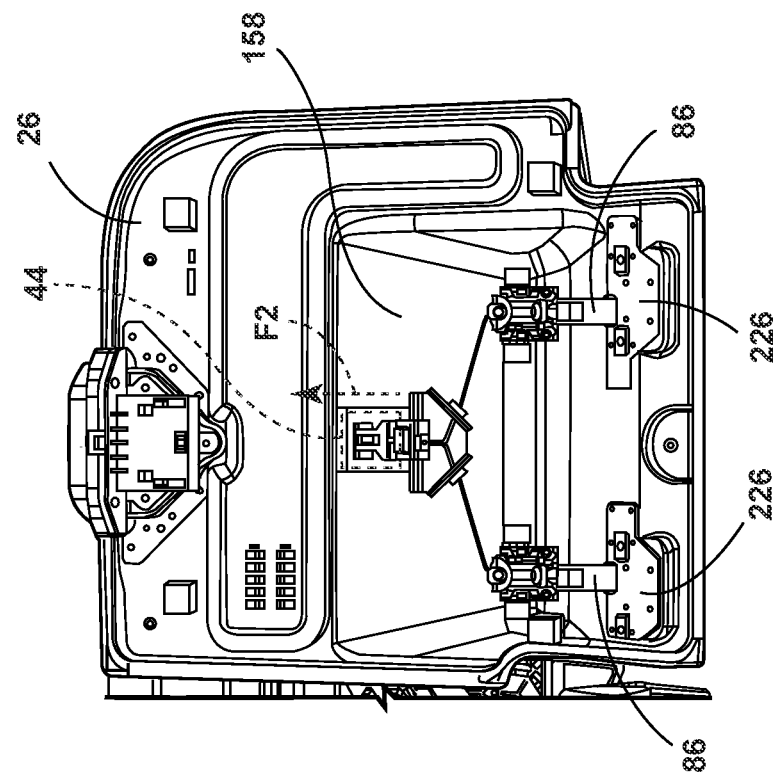
FIG. 8A is a top elevational view of a panel of the removable support member attached to the tongues and an actuation force exerted on the actuator, according to an aspect of the present disclosure.

Referring now to FIGS. 8A and 8B, the removable support member 26 may be removed from the tongues 86 if an actuation force F2 is exerted on the actuator 44. The removable support member 26 may be joined to the tongues 86 if an installation force F3 is exerted on the removable support member 26. The tongues 86 may extend through tongue plates 226 that may be mounted to the panel 158. The tongue plates 226 may be disposed over the outside corner portions 230 and 234 of the elongated member 90 when the removable support member 26 is secured to the seat base 22.

Referring to FIGS. 9A-9D, the tongue plates 226, the latch assemblies 82, and the intermediate assembly 170 may be disposed on the panel 158. The wire assembly 174 may be disposed between the release mechanism 182 and the latch assemblies 82. With reference to FIGS. 9C-9D, an actuation member 238 may extend from the latch assembly 82. The actuation force F2 may translate from the actuator 44 to the actuation member 238 to release the latch assembly 82 from the tongue 86. In some examples, the actuation member 238 may be a rigid part. In some examples, the actuation member 238 may be a wire. In some examples, the wire may be the branch wire 186 or the branch wire 190 of the wire assembly 174. The latch assemblies 82 may be disposed in housings 242.

Figure 10B:
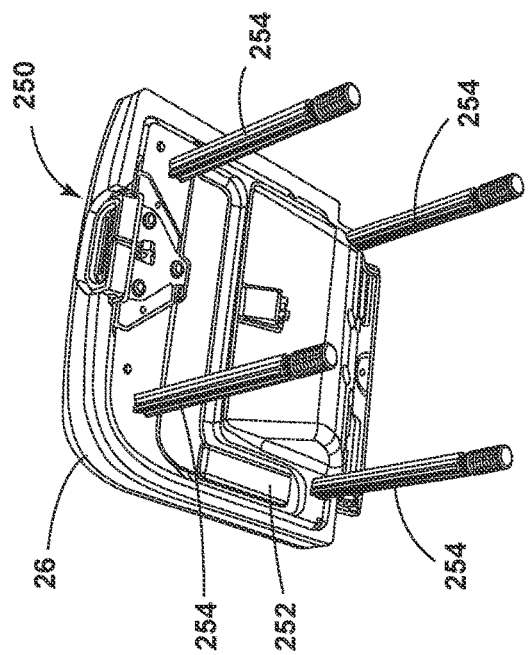
FIG. 10B is a bottom perspective view of a removable support member with seat props attached to the underside of the removable support member, according to an aspect of the present disclosure.
Figure 10C:
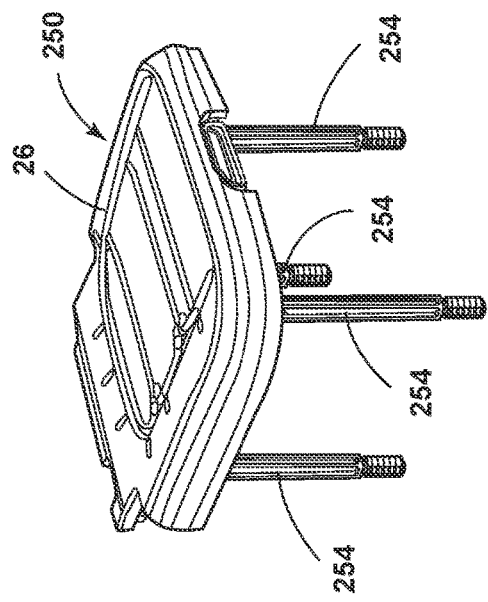
FIG. 10C is a side perspective view of a removable support member with seat props attached to the underside of the removable support member and configured as a stool, according to an aspect of the present disclosure.
Figure 10A:
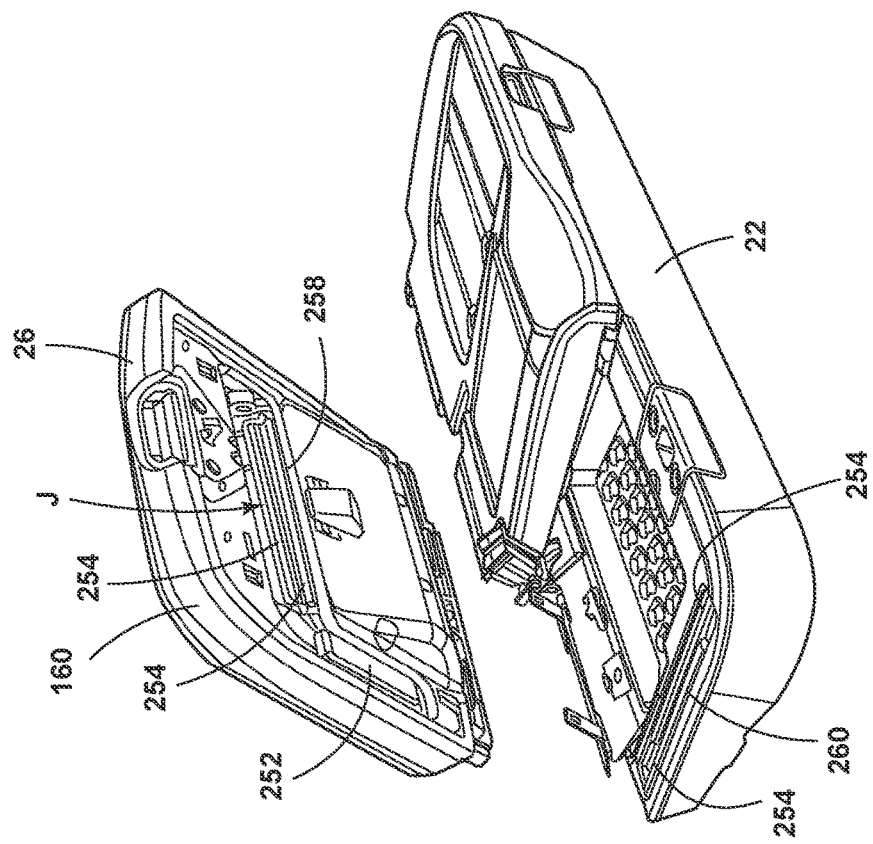
FIG. 10A is a side perspective view of a removable support member detached from a base and a removable support member attached to a base, according an aspect of the present disclosure.

Referring to FIGS. 10A-10C, an occupant may attach a seat prop to the removable support member 26 to create a stool 250. The stool 250 may be used outside of the vehicle. In the example shown, the seat prop includes legs 254. Two legs 254 may be stored in a storage depression 258 in the removable support member 26. The two legs 254 may be snap-fit into the storage depression 258. Two legs 254 may be stored in the storage depression 260 in the base 22. The two legs 254 may be snap-fit into the storage depression 260. As such, when the legs are in the storage depression 258, the legs 254 may be disposed in an initial position J adjacent to the removable support member 26. Additionally, when the legs 254 are in the storage depression 260, the legs 254 may be disposed in an initial position J adjacent to the removable support member 26 in the closed position A. When the removable support member 26 is outside of the vehicle, the legs 254 may be attached to an underside of the removable support member 26 to create a stool 250. The underside of the stool 250 may include a storage compartment 252 for storing various items (for example, a first aid kit).

Referring to FIGS. 11A-11D, the legs 254 of the stool 250 may have functional features. A leg 254 may include a shaft 262 and a tip 266. The shaft 262 may include a threaded end 270. The tip 266 may be screwed onto the threaded end 270. The threaded end 270 of the shaft 262, in combination with the tip 266, may be used to adjust the height of the leg 254 to accommodate use of the stool 250 on irregular or uneven surfaces. Nubs 274 may be disposed around the tip 266. Nubs 274 may encircle the tip 266. The shaft 262 may include a double-C profile 278. The double-C profile may be the shape of a cross-section of the leg 254 taken along the shaft 262 and orthogonal to the shaft 262. Two C-shaped brackets 282 and 286 may be welded together to create the shaft 262 having the double-C profile 278. The design of the leg 254 with two C-shaped brackets 282 and 286 may increase the strength of the leg 254. The panel 158 may include openings 290 having double-C shapes 294. The legs 254 may be inserted into the openings 290 of the removable support member 26. The openings 290 of the removable support member 26 may form an interference fit with the ends of the legs 254 to secure the legs 254 within the removable support member 26. It is to be understood that legs 254 of various shapes, sizes, and constructions may be used in connection with the removable support member 26 to create a stool 250.

Referring now to FIGS. 12A-12C, a removable support member 26A is shown according to another aspect of the present disclosure. The seating assembly 10A may include a seat 14A and a seatback 18A. The seating assembly 10A may be in a vehicle interior 34A. With reference to FIG. 12B, the removable support member 26A may be rotated about an edge 50A of the seat 14A and between a closed position A1 and an open position B1. The open position B1 may include a substantially upright position M of the removable support member 26A. The edge 50A of the seat 14A may be opposite the seatback 18A.

With reference to FIG. 12C, the removable support member 26A may be removed from the vehicle and configured to be a bench 300. The removable support member 26A may include a seat prop that may be coupled to the removable support member 26A to create a bench 300. The seat prop may include a pair of legs 304 and 308. Each leg 304 and 308 may be moved from an initial position J1 adjacent to the removable support member 26A to a final position K1 orthogonal to the removable support member 26A. The seat legs 304 and 308 may move between the initial position J1 and the final position K1 in the directions shown by arrows 312 and 316. The removable support member 26A with the pair of legs 304 and 308 in positions orthogonal to the removable support member 26A may create a bench 300. The bench 300 may be used outside of the vehicle. The legs 304 and 308 may have U-shaped configurations 320 and 324. Cross bars 328 and 332 may be disposed in each of the U-shaped configurations 320 and 324 of each of the legs 304 and 308.

Figure 13A:
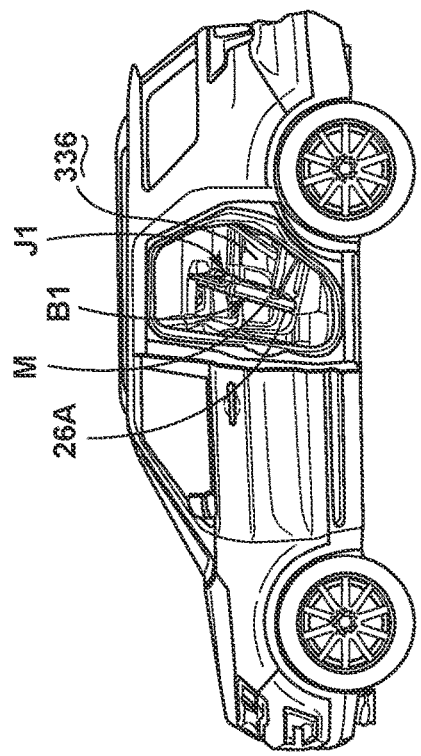
FIG. 13A is a left elevational view of a vehicle with the removable support member in a substantially upright position, according to another aspect of the present disclosure.
Figure 13B:
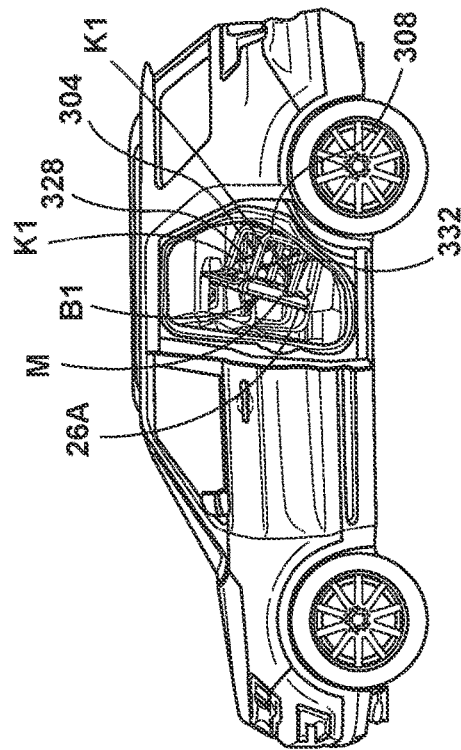
FIG. 13B is a left elevational view of a vehicle with the removable support member in a substantially upright position and a pair of seat props disposed orthogonal to the removable support member, according to another aspect of the present disclosure.
Figure 13C:
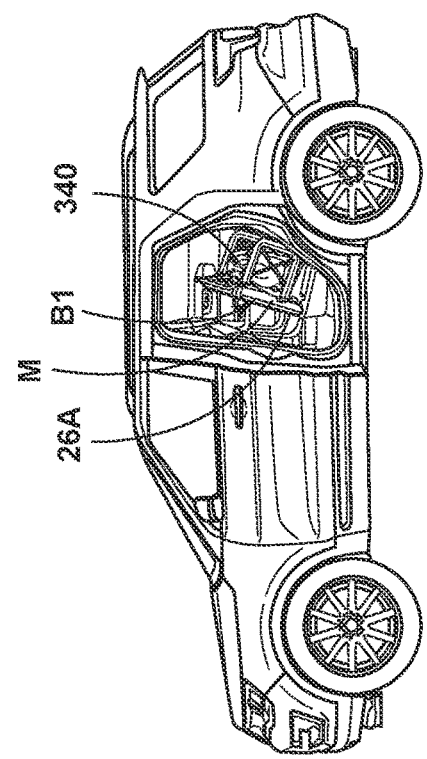
FIG. 13C is a left elevational view of a vehicle with the removable support member in a substantially upright position and a pair of seat props disposed orthogonal to the removable support member with a first cargo type, according to another aspect of the present disclosure.
Figure 13D:
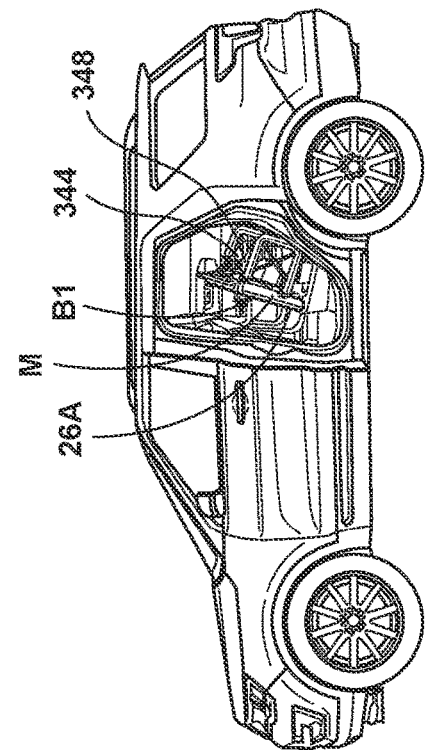
FIG. 13D is a left elevational view of a vehicle with the removable support member in a substantially upright position and a pair of seat props disposed orthogonal to the removable support member with a second cargo type, according to another aspect of the present disclosure.

Referring to FIGS. 13A-13D, the removable support member 26A in the open position B1 may define a storage space 336 between the removable support member 26A and the seatback 18A. The open position B1 of the removable support member 26A shown in FIGS. 13A-13D may be a substantially upright position M. With reference to FIG. 13A, the legs 304 and 308 may be in initial positions J1 disposed adjacent to the underside of the removable support member 26A. With reference to FIG. 13B, the legs 304 and 308 may be in final positions K1 disposed orthogonal to the underside of the removable support member 26A. The legs 304 and 308 in the final positions K1 orthogonal to the removable support member 26A may further define the storage space 336 between the removable support member 26A in the substantially upright position M and the seatback 18A. The cross bars 328 and 332 in each leg 304 and 308 may contain cargo disposed in the storage space 336. With reference to FIG. 13C, cargo is shown in the storage space 336. The cargo may include a stuffed animal 340. With reference to FIG. 13D, the cargo disposed in the storage space 336 may include water tanks 344 and 348. As such, the storage space 336 surrounded by the legs 304 and 308 in the final positions K1 and the associated cross bars 328 and 332 may increase the cargo capacity of the vehicle.

Figure 14A:
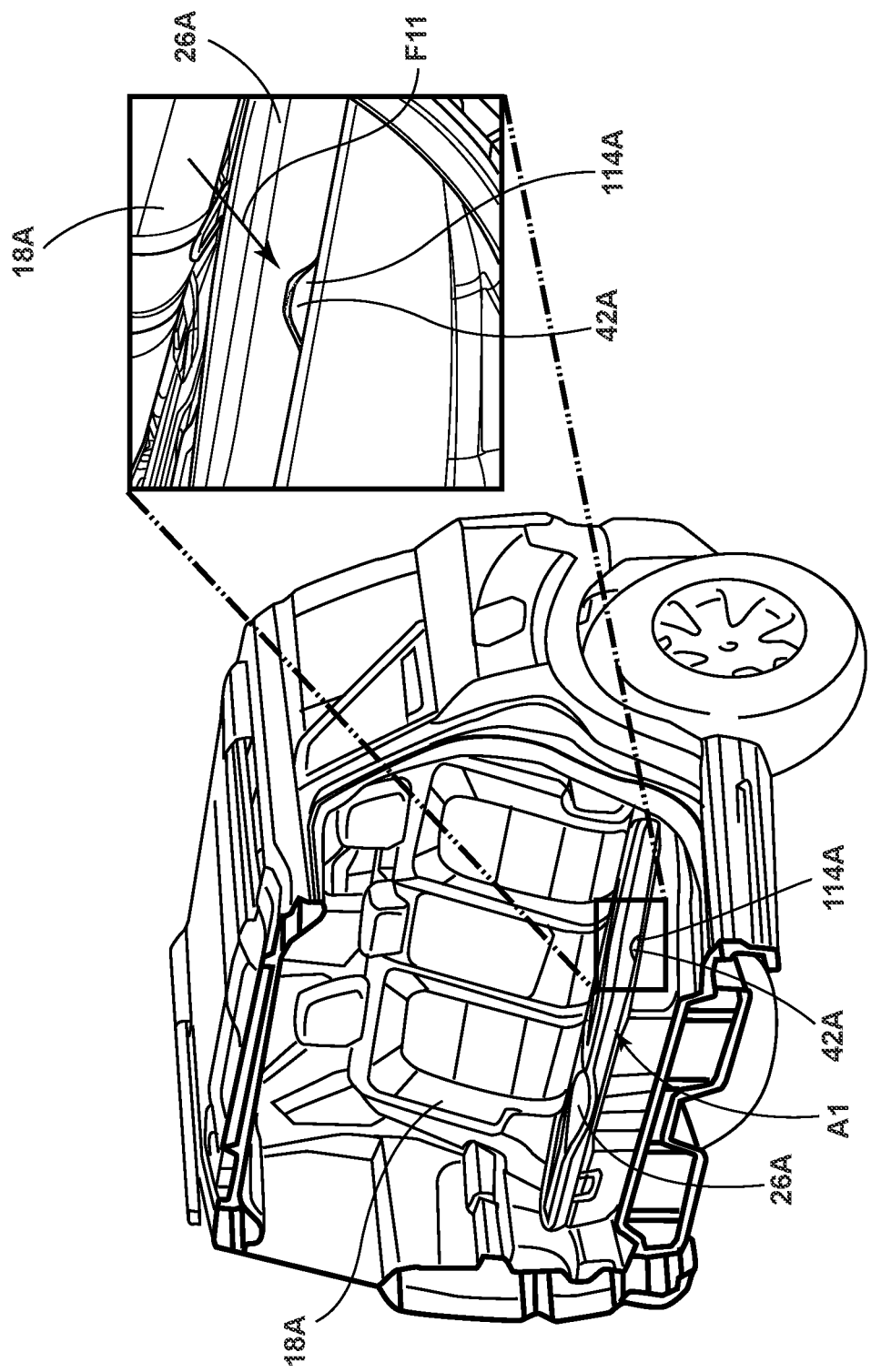
FIG. 14A is front perspective view of an actuator disposed in the removable support member, according to another aspect of the present disclosure.
Figure 14B:
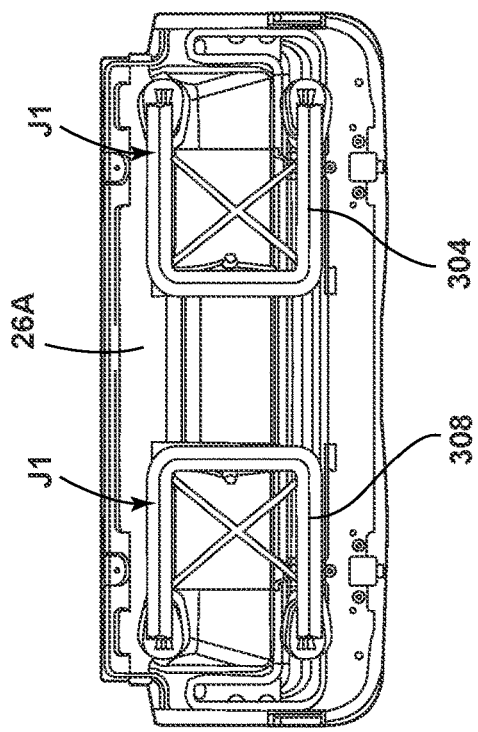
FIG. 14B is a bottom plan view of a removable support member with a pair of seat props disposed adjacent to the removable support member, according to another aspect of the present disclosure.
Figure 14D:
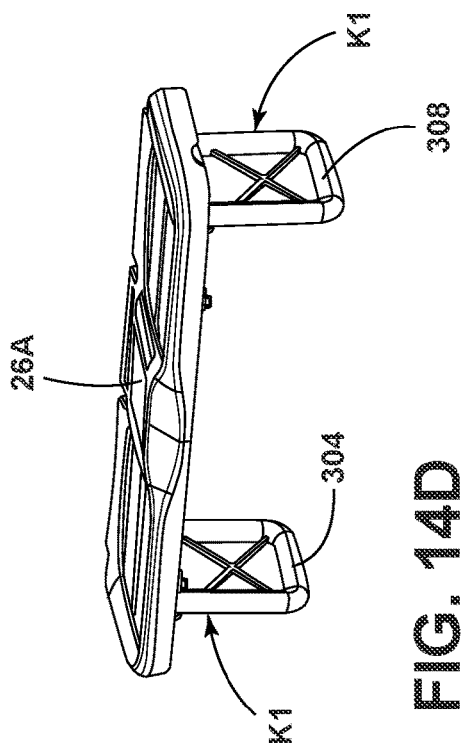
FIG. 14D is a perspective view of the removable support member detached from the vehicle seating assembly and configured as a bench, according to another aspect of the present disclosure.
Figure 14C:
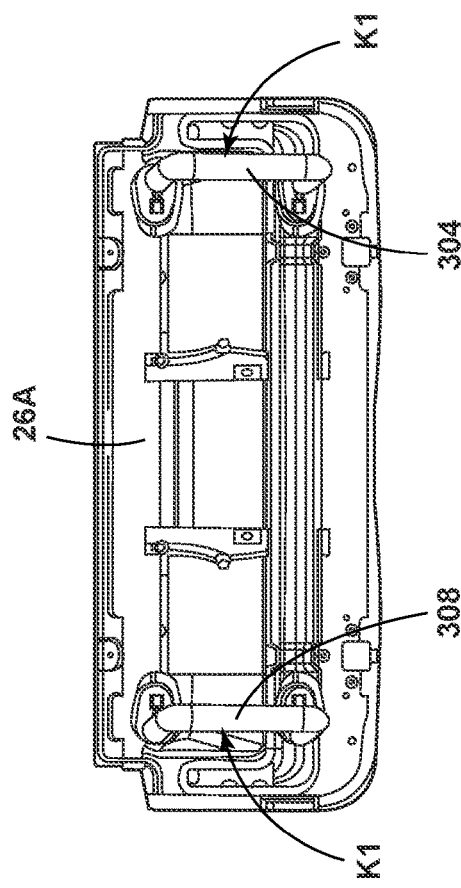
FIG. 14C is a bottom plan view of a removable support member with a pair of seat props disposed orthogonal to the removable support member, according to another aspect of the present disclosure.

Referring to FIGS. 14A-14D, an actuation force F11 may be exerted on an actuator 42A disposed in the removable support member 26A to move the removable support member 26A from the closed position A1 to the open position B1. The actuation force F11 may be exerted on the button 114A disposed in the actuator 42A. With reference to FIG. 14B, the legs 304 and 308 are shown disposed in the initial position J1 adjacent to the underside of the removable support member 26A. With reference to FIG. 14C, the legs 304 and 308 are shown disposed in the final position K1 orthogonal to the underside of the removable support member 26A.

Figure 15A:
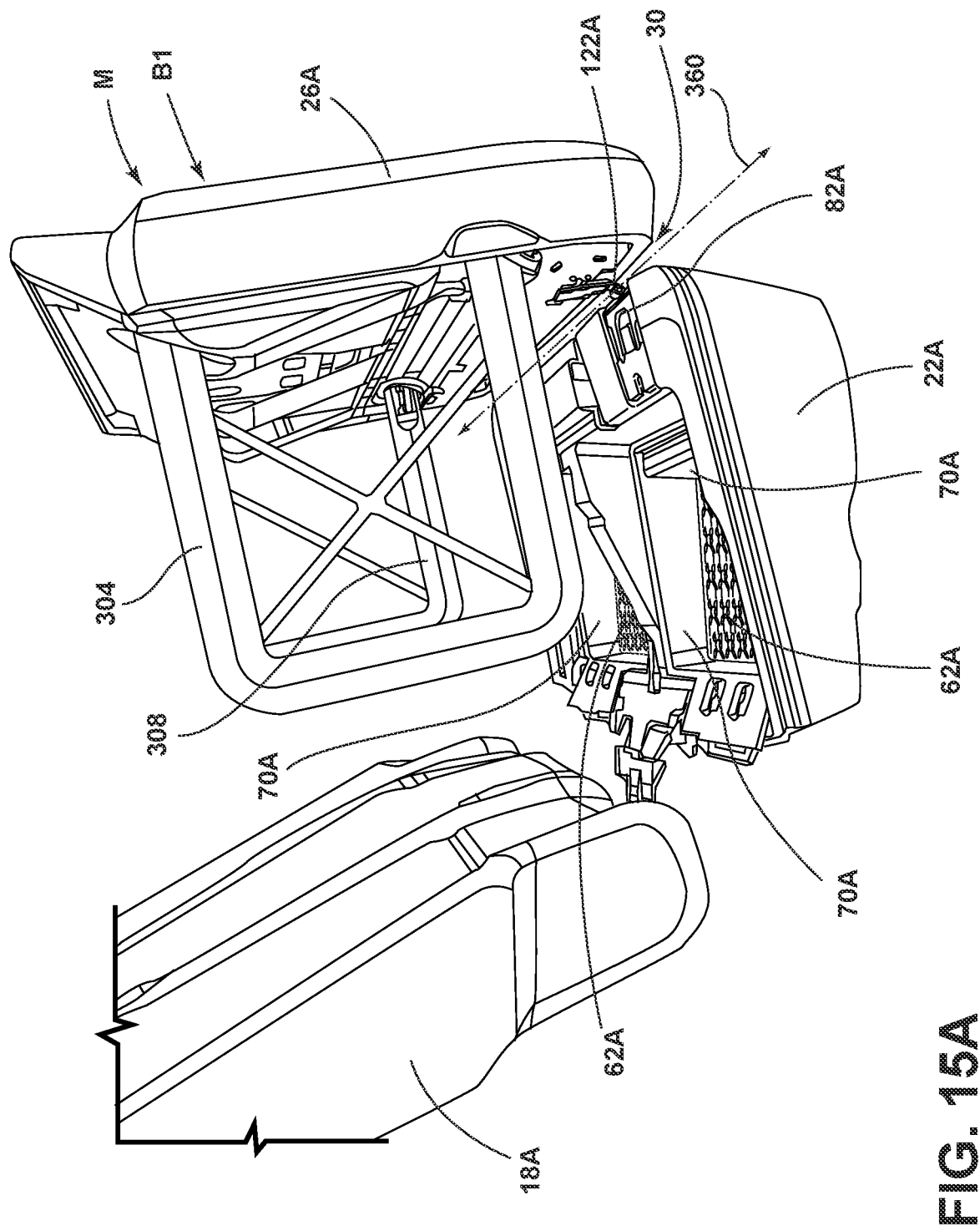
FIG. 15A is a perspective view of the latch assembly and tongue disposed between the removable support member and the base, according to another aspect of the present disclosure.
Figure 15B:
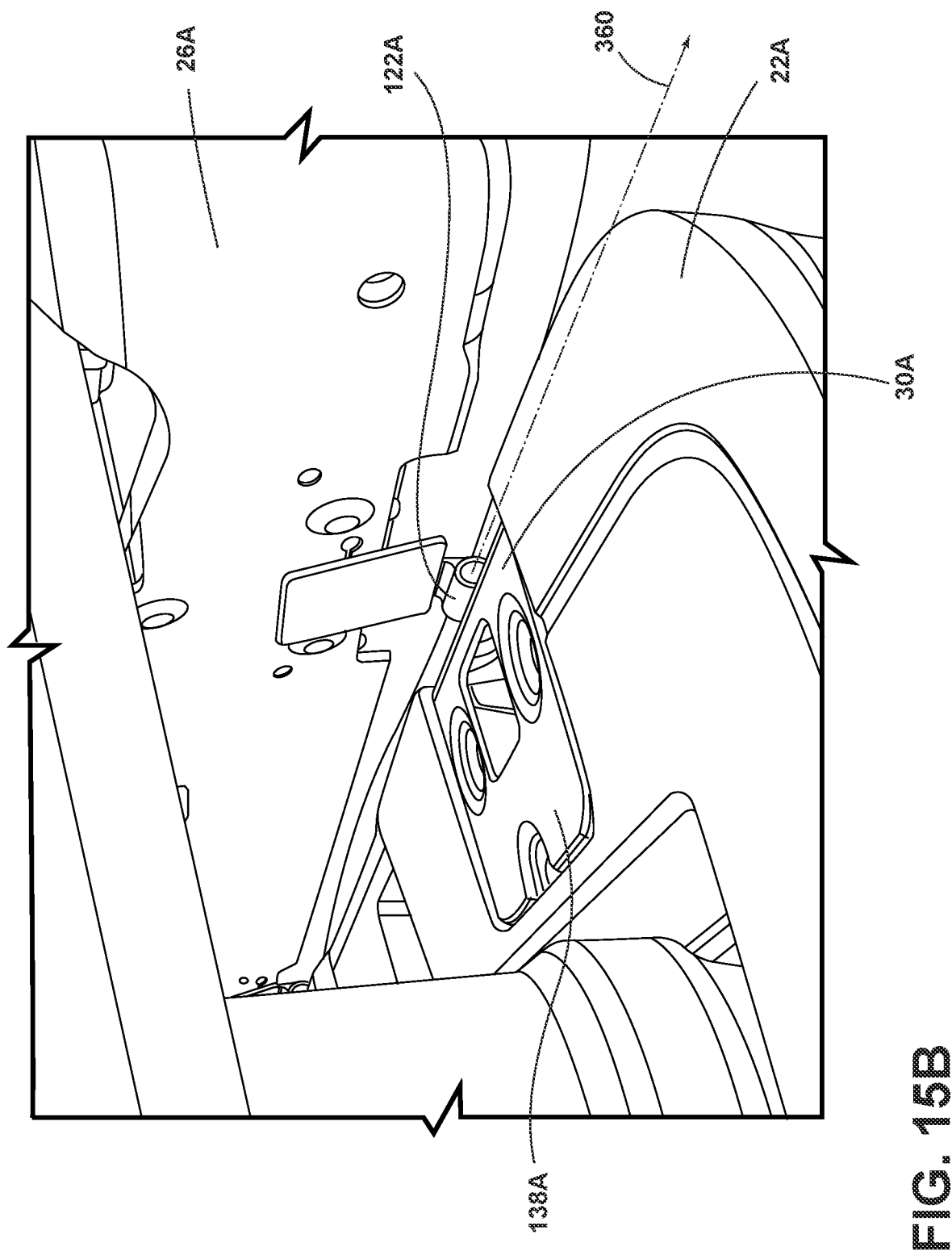
FIG. 15B is a right perspective view of a latch assembly and tongue disposed between the removable support member and the base, according to another aspect of the present disclosure.

With reference to FIGS. 15A-15B, an attachment assembly 30A may be disposed between the seat base 22A and the removable support member 26A. A hinge 122A may also be disposed between the seat base 22A and the removable support member 26A. A hinge plate 138A may be mounted on the seat base 22A. The removable support member 26A may be rotated around the axis of rotation 360 between the closed position A1 and the open position B1. The hinge 122A may define the axis of rotation 360A.

Figure 16:
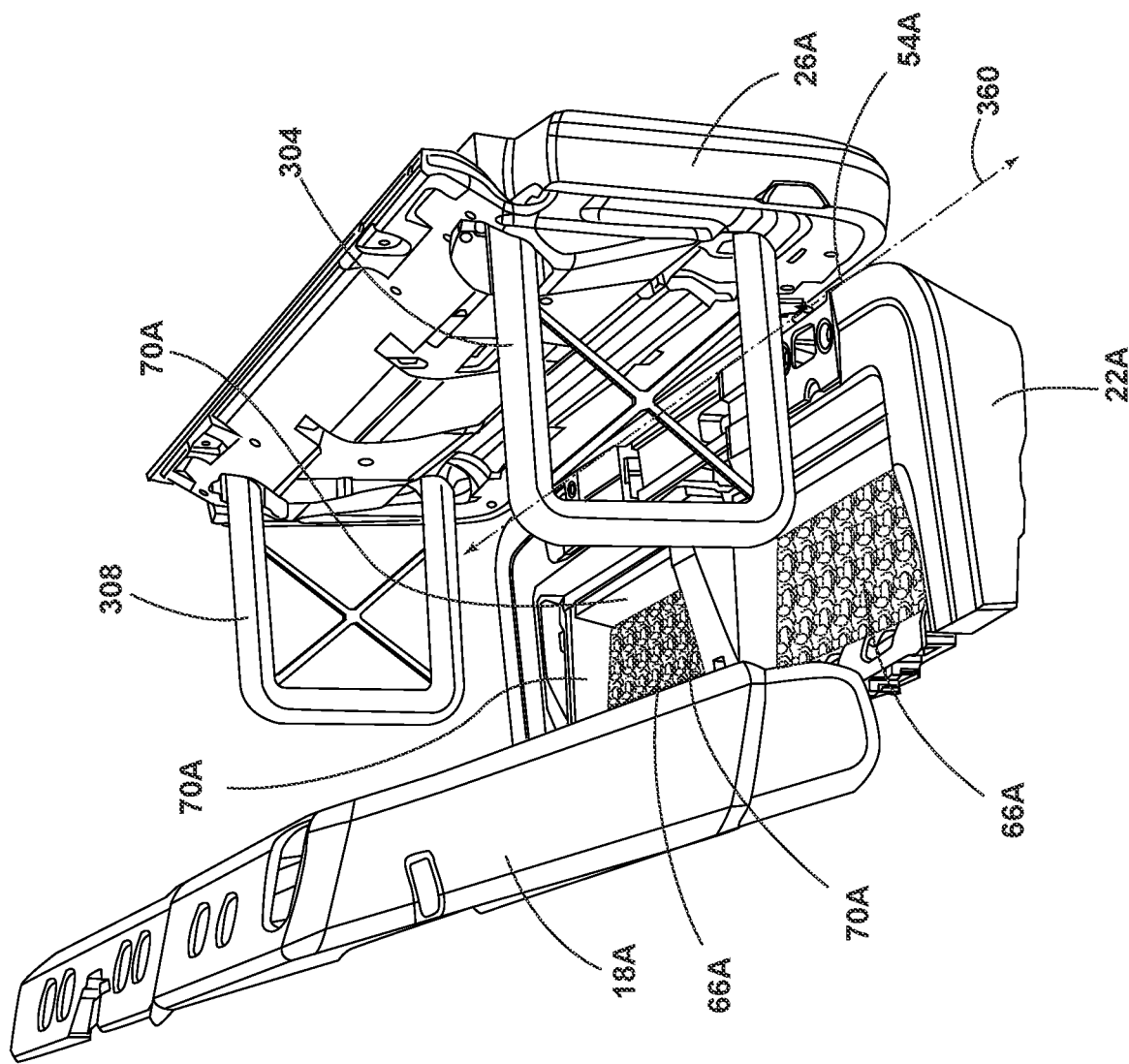
FIG. 16 is a right perspective view of the latch assembly and tongue disposed between the removable support member and the base, according to another aspect of the present disclosure.

Referring to FIG. 16, the seat base 22A and the removable support member 26A in the closed position A1 (FIGS. 12A and 14A) may define a storage cavity 62A. The seat floor 66A and the walls 70A may further define the storage cavity 62A.

Figure 17:
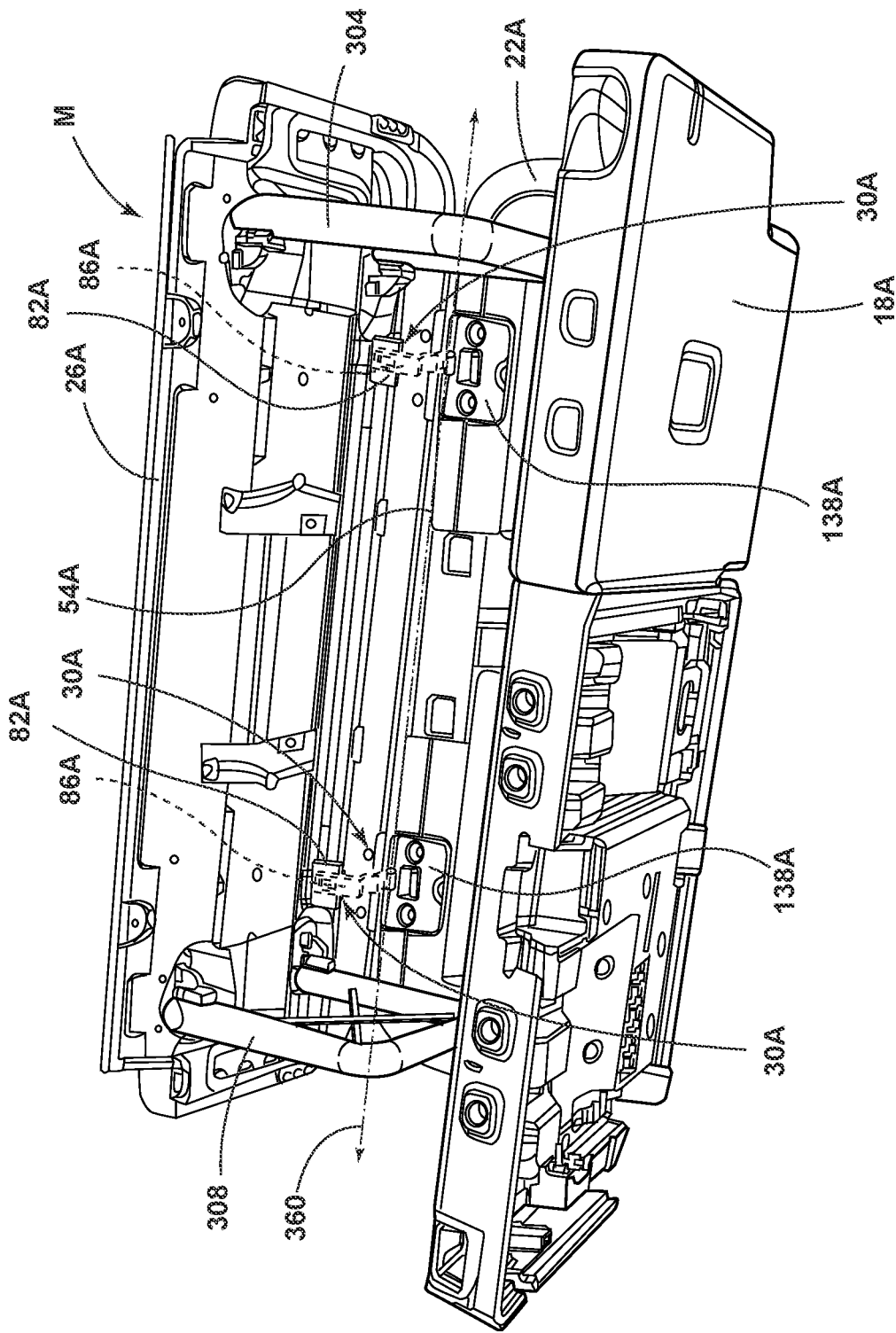
FIG. 17 is a top perspective view of a pair of latch assemblies and a pair of tongues disposed between the removable support member and the base, according to another aspect of the present disclosure.

Referring to FIG. 17, the tongues 86A may be rotatable about an axis of rotation 360 that may extend along the edge 54A of the seat base 22A as the removable support member 26A moves between the closed position A1 and the substantially upright position M.

Figure 18:
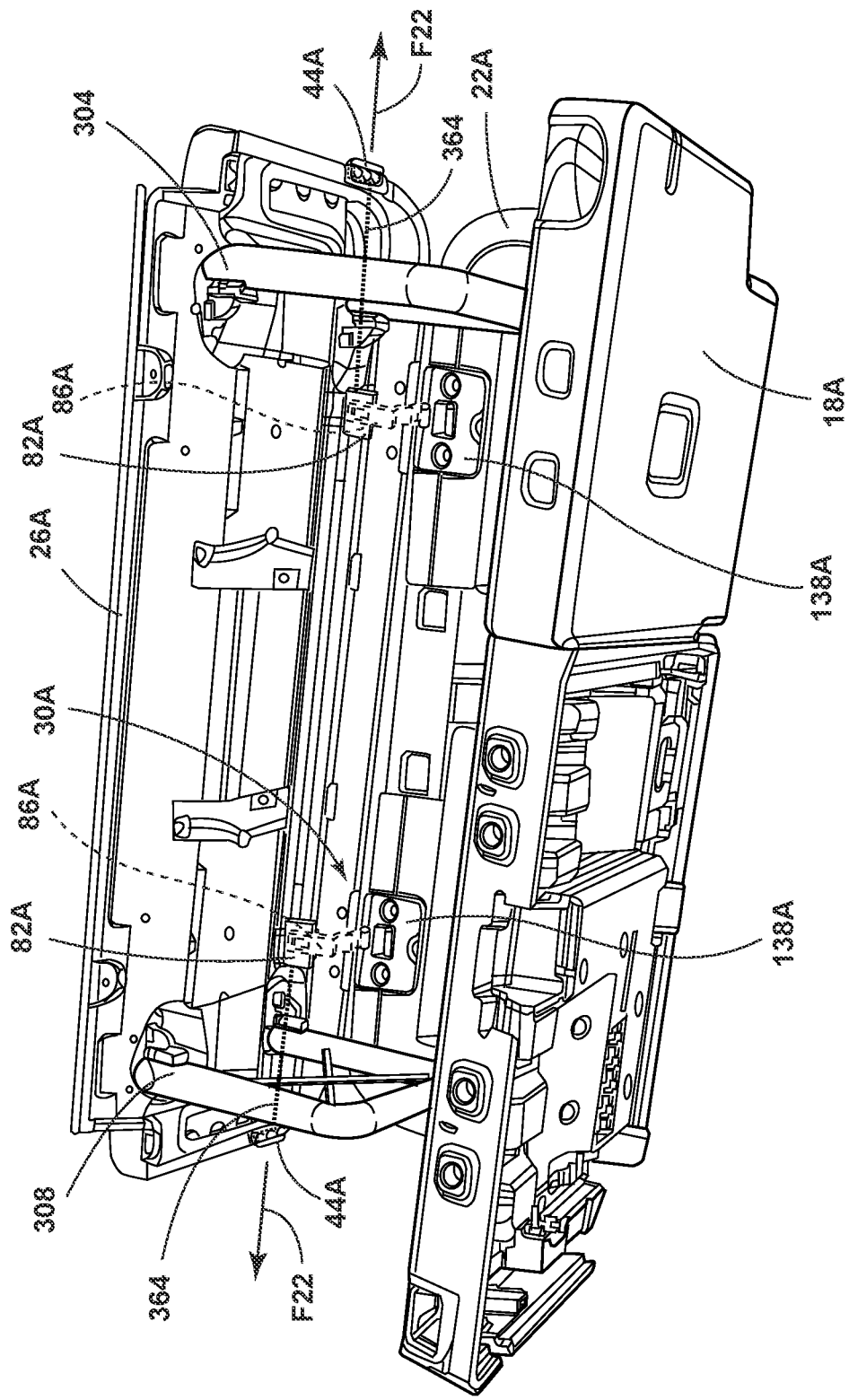
FIG. 18 is a top perspective view of a pair of latch assemblies and a pair of tongues disposed between the removable support member and the base and a pair of actuators coupled to each of the pair of latch assemblies, according to another aspect of the present disclosure.

Referring to FIG. 18, actuators 44A may be positioned in the removable support member 26A. The actuators 44A may be operably coupled to the latch assemblies 82A. Actuation forces F22 may be exerted on the latch assemblies 82A to move the latch assemblies 82A from latched positions to unlatched positions. The actuators 44A may be disposed on the sides of the removable support member 26A. Latch assembly-actuator couplings 364 may extend between the latch assemblies 82A and the actuators 44A. The actuation forces F22 exerted on the actuators 44A may cause the latch assemblies 82A to unlatch from the tongues 86A, thereby allowing for the removal of the removable support member 26A from the vehicle. The removable support member 26A may be used as a bench 300 outside of the vehicle upon removal from the vehicle.

In various examples of the present disclosure, the removable support members 26 and 26A may be waterproof.

A variety of advantages may be obtained by use of the present disclosure. The removable support members 26 and 26A may be converted into stools 250 and benches 300, respectively. The stools 250 and benches 300 may provide comfort during camping experiences. The legs 254 may be conveniently stored in the stool 250 for use as a seat 14 in a vehicle. The legs 304 and 308 may be conveniently stored in the bench 300 for use as a seat 14A in a vehicle. As such, the stool 250 and the bench 300 may be embedded in the vehicle when they are not in use outside of the vehicle. The placement of the tongues 86 and 86A on opposing sides of the seat bases 22 and 22A may provide for stable attachment of the removable support members 26 and 26A to the seat bases 22 and 22A. The removable support member 26A in the substantially upright position M with the legs 304 and 308 in the final positions K1 orthogonal to the removable support member 26A, along with the cross bars 328 and 332, may create a storage space 336 that may increase the cargo capacity of the vehicle.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a seat including;
      a base having an edge; and
      a removable support member pivotably coupled to the base and movable between a closed position and an open position, the removable support member defining a tongue slot wherein the removable support member comprises a seat cushion that is not a supplemental seat cushion and is not configured to be disposed atop an existing seat cushion when the removable support member is coupled to the base;
   a seatback; and
   an attachment assembly disposed between the removable support member and the base, the attachment assembly includes:
      an elongate tongue configured to extend through the tongue slot, wherein the elongate tongue is rotatably coupled to the edge of the base, and wherein the elongate tongue extends lengthwise from the edge of the base; and
      a latch assembly coupled to the removeable support member, wherein the latch assembly is configured to selectively couple to the elongate tongue.

2. The vehicle seating assembly of claim 1, wherein the elongate tongue is directly, pivotably coupled to the base.

3. The vehicle seating assembly of claim 2, wherein the elongate tongue is rotatable about an axis of rotation disposed along the edge of the base, and wherein the elongate tongue radially extends lengthwise from the axis of rotation.

4. The vehicle seating assembly of claim 3, wherein the edge of the base includes an edge of the base disposed adjacent to the seatback.

5. The vehicle seating assembly of claim 4, wherein the elongate tongue extends from an elongated member rotatable around the axis of rotation.

6. The vehicle seating assembly of claim 5, further comprising:
   a hinge disposed between the removable support member and the base.

7. The vehicle seating assembly of claim 6, further comprising:
   a storage cavity defined by the base and the removable support member in the closed position.

8. The vehicle seating assembly of claim 7, further comprising:
   a seat prop storable in the removable support member.

9. The vehicle seating assembly of claim 3, wherein the edge of the base includes an edge of the base disposed opposite the seatback.

10. The vehicle seating assembly of claim 9, wherein the removable support member is disposed in a substantially upright position to define a storage space between the removable support member and the seatback.

11. The vehicle seating assembly of claim 10, further comprising: a seat prop disposable in the removable support member and positionable orthogonal to the removable support member and the seatback to further define the storage space between the removable support member and the seatback.

12. The vehicle seating assembly of claim 11, wherein the removable seat prop comprises a seat leg movable between an initial position adjacent to the removable support member and a final position orthogonal to the removable support member.

13. The vehicle seating assembly of claim 1, wherein the removable support member has a second edge selectively proximal with the edge of the base, wherein the second edge defines the tongue slot.

14. A vehicle seating assembly comprising:
a base disposed on a vehicle floor, the base having an edge;
a hinge disposed along the edge of the base and defining an axis of rotation, the hinge radially extending from the axis of rotation;
a removable support member defining a tongue slot, removable support member configured to be moved between an attached state and a detached state relative to the base, wherein the removable support member is rotatable around the axis of rotation between a closed position and an open position relative to the base when in the attached state, and wherein the removable support member comprises a seat cushion that is not a supplemental seat cushion and is not configured to be disposed atop an existing seat cushion when the removable support member is in the attached state;
a latch assembly coupled to the removable support member, wherein the latch assembly is movable between a latched position and an unlatched position in response to an actuation force; and
an elongate tongue disposed between the removable support member and the hinge, wherein the elongate tongue is rotatably coupled to the edge of the base and extends lengthwise radially from the axis of rotation, wherein the elongate tongue extends through the tongue slot when the removable support member is in the attached position, and wherein the latch assembly is coupled to the elongate tongue when in the latched position, and further wherein the elongate tongue is revealed when the removable support member is in the detached position.

15. The vehicle seating assembly of claim 14, wherein the latch assembly is disposed in the removable support member and the tongue is operably coupled to the hinge and rotatable about the axis of rotation defined by the hinge.

16. The vehicle seating assembly of claim 15, further comprising: a pair of latch assemblies including the latch assembly, and
a pair of tongues including the elongate tongue.

17. The vehicle seating assembly of claim 16, wherein the pair of tongues are integral to an elongated member rotatably coupled to the hinge.

18. A vehicle seating assembly comprising:
a seat base having an edge;
a removable support member positionable between an attached state and a detached state relative to the seat base and rotatable between a closed position and an open position relative to the seat base, wherein the removable support member rotates about an axis of rotation aligned with the edge of the seat base wherein the removable support member comprises a seat cushion that is not a supplemental seat cushion and that is not configured to be disposed atop an existing seat cushion when the removable support member is in the attached state;
an attachment assembly disposed between the seat base and the removable support member and including;
a latch assembly disposed in the removable support member;
an elongate tongue rotatably coupled to the edge of the seat base, the elongate tongue extending lengthwise radially from the axis of rotation, wherein the elongate tongue is operably coupled with the latch assembly; and
a biasing member engaged with the elongate tongue, the biasing member biasing the elongate tongue to rotate about the axis of rotation such that the elongate tongue is rotated to facilitate movement of the removable support member from the detached state to the attached state; and
an intermediate assembly disposed between an actuator and the latch assembly, wherein an actuation force is exerted on the actuator to move the latch assembly from a latched position to an unlatched position, thereby moving the removable support member from the attached state position to the detached state.

19. The vehicle seating assembly of claim 18, further comprising:
a panel disposed in the removable support member, wherein the latch assembly and the actuator are mounted to the panel.

20. The vehicle seating assembly of claim 19, wherein the elongate tongue is:
an anchor coupled to the seat base and engageable with the latch assembly.

* * * * *

UNITED STATES PATENT AND TRADEMARK OFFICE
CERTIFICATE OF CORRECTION

PATENT NO. : 11,951,950 B2
APPLICATION NO. : 17/445009
DATED : April 9, 2024
INVENTOR(S) : Ruelas et al.

It is certified that error appears in the above-identified patent and that said Letters Patent is hereby corrected as shown below:

In the Claims

Column 10:
Claim 1, Line 23;
After "slot" insert --,--.

Column 11:
Claim 14, Line 24;
After "slot," insert --the--.

Column 12:
Claim 18, Line 15;
After "base" insert --,--.

Column 12:
Claim 18, Line 41;
Delete "position".

Signed and Sealed this
Twenty-first Day of May, 2024

Katherine Kelly Vidal
*Director of the United States Patent and Trademark Office*